(12) United States Patent
Hirate

(10) Patent No.: US 9,208,503 B2
(45) Date of Patent: Dec. 8, 2015

(54) INFORMATION PROCESSING APPARATUS, INFORMATION PROCESSING METHOD, INFORMATION PROCESSING PROGRAM, AND RECORDING MEDIUM

(71) Applicant: Rakuten, Inc., Shinagawa-ku, Tokyo (JP)

(72) Inventor: Yu Hirate, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/112,421

(22) PCT Filed: Nov. 26, 2012

(86) PCT No.: PCT/JP2012/080434
§ 371 (c)(1),
(2) Date: Oct. 17, 2013

(87) PCT Pub. No.: WO2013/179512
PCT Pub. Date: Dec. 5, 2013

(65) Prior Publication Data
US 2014/0229229 A1    Aug. 14, 2014

(30) Foreign Application Priority Data

May 30, 2012  (JP) ................................. 2012-123727

(51) Int. Cl.
| G06F 17/30 | (2006.01) |
| G06F 7/00 | (2006.01) |
| G06Q 30/02 | (2012.01) |
| G06Q 10/00 | (2012.01) |

(52) U.S. Cl.
CPC ............ *G06Q 30/0201* (2013.01); *G06Q 10/00* (2013.01); *G06F 17/30864* (2013.01); *G06F 17/30867* (2013.01)

(58) Field of Classification Search
USPC ......................................................... 707/707
See application file for complete search history.

(56) References Cited

U.S. PATENT DOCUMENTS

| 5,860,116 | A | 1/1999 | Washington |
| 2007/0150345 | A1* | 6/2007 | Tonse et al. ..................... 705/14 |
| 2007/0220195 | A1 | 9/2007 | Kawaguchi |
| 2007/0273896 | A1* | 11/2007 | Yamamura .................... 358/1.1 |
| 2012/0239498 | A1* | 9/2012 | Ramer et al. ................ 705/14.53 |

FOREIGN PATENT DOCUMENTS

| JP | 05-307569 A | 11/1993 |
| JP | 07-325832 A | 12/1995 |

(Continued)

*Primary Examiner* — Kuen Lu
(74) *Attorney, Agent, or Firm* — Sughrue Mion, PLLC

(57) ABSTRACT

An information processing apparatus determines a threshold value of the number of times of use of a keyword on the basis of the number of times of use of the keyword in each unit period included in a cycle period. Next, the information processing apparatus identifies a period in which the numbers of times of use exceeds the threshold value in the cycle period as a candidate of a popularity period of the keyword. Next, the information processing apparatus excludes the identified period from the popularity period if a situation in which the numbers of times of use in the identified period exceed the threshold value is different from a situation based on a periodic popularity of the keyword. When the identified candidate period is not excluded from the popularity period, the information processing apparatus determines the identified period to be the popularity period.

14 Claims, 18 Drawing Sheets

(56) References Cited

FOREIGN PATENT DOCUMENTS

| | | |
|---|---|---|
| JP | 2003-006195 A | 1/2003 |
| JP | 2004-240887 A | 8/2004 |
| JP | 2004-362451 A | 12/2004 |
| JP | 2006-072840 A | 3/2006 |
| JP | 2008-040636 A | 2/2008 |
| JP | 2008-262301 A | 10/2008 |
| JP | 2009-116440 A | 5/2009 |
| JP | 2010-033559 A | 2/2010 |
| JP | 2012-038135 A | 2/2012 |
| WO | 96/35169 A1 | 11/1996 |
| WO | 2007/043322 A1 | 4/2007 |

* cited by examiner

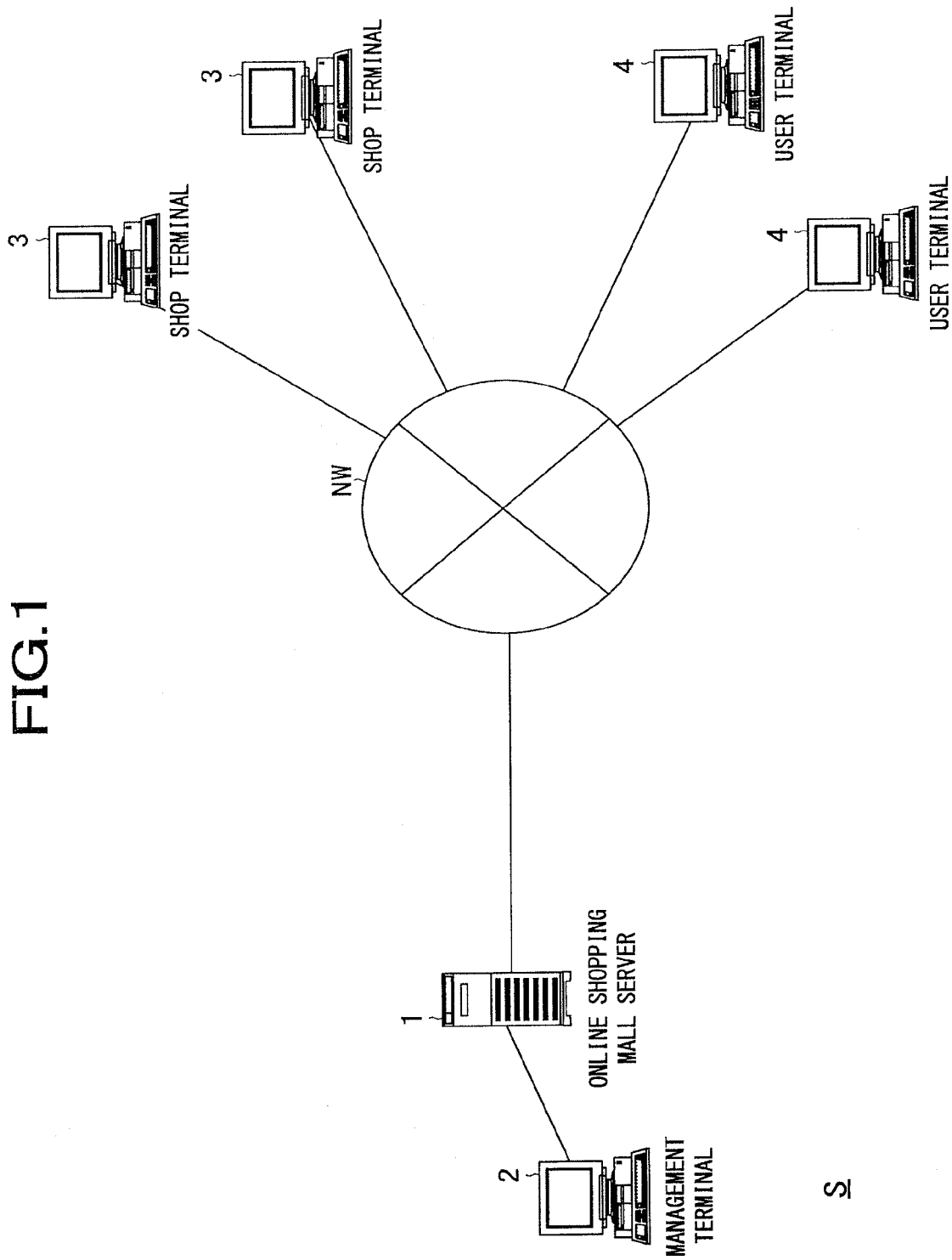

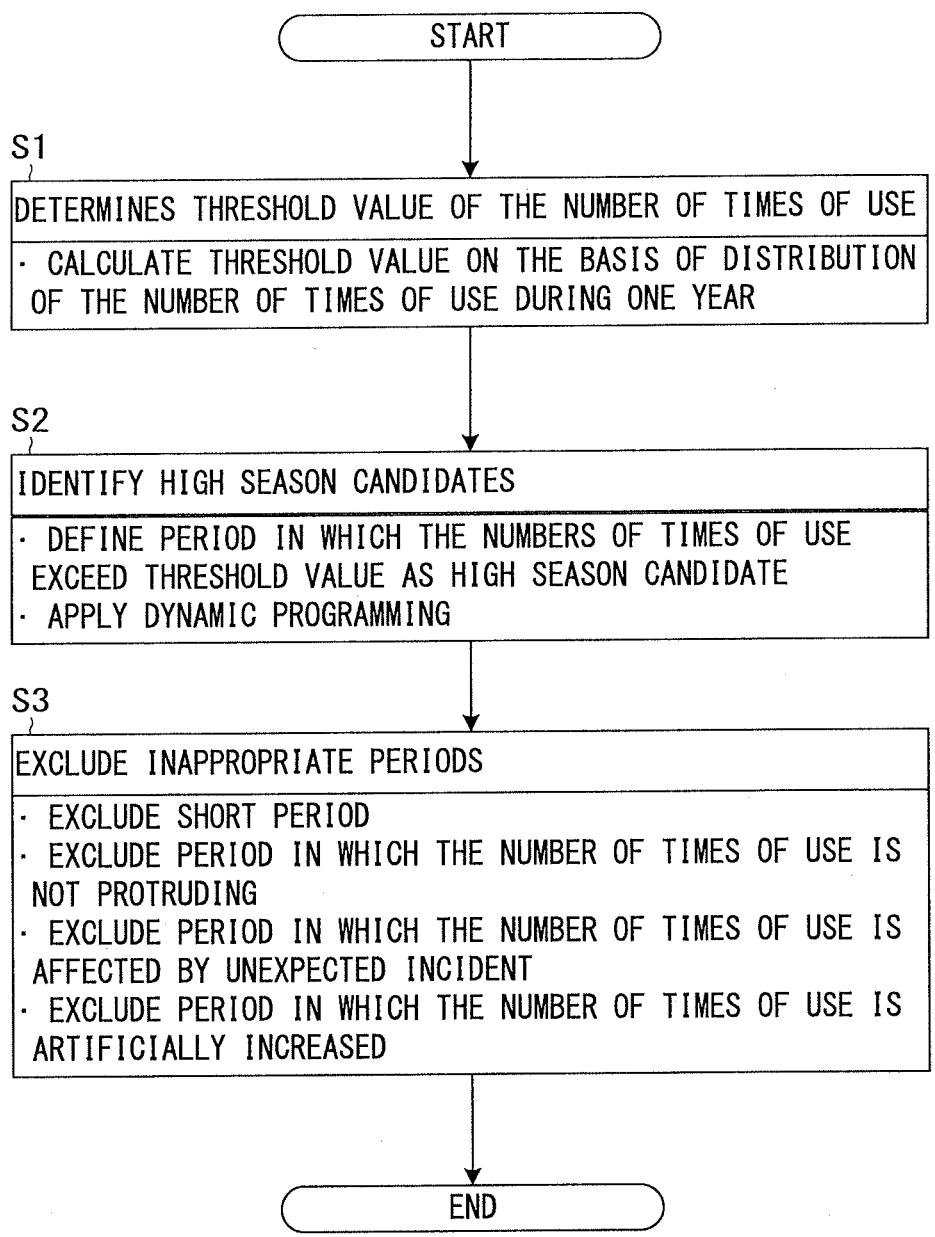

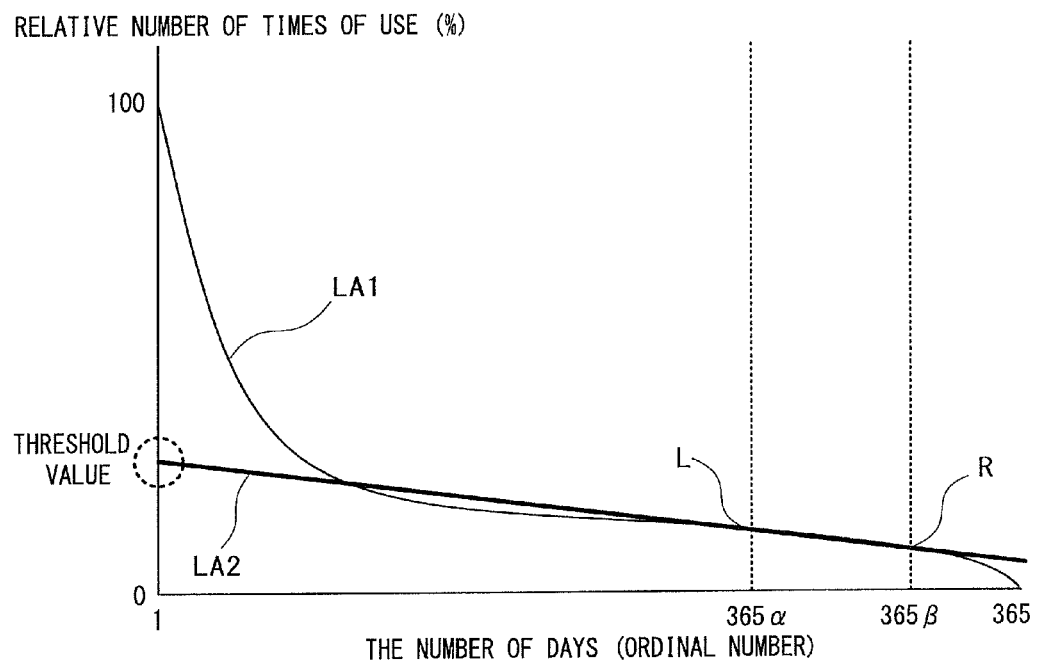
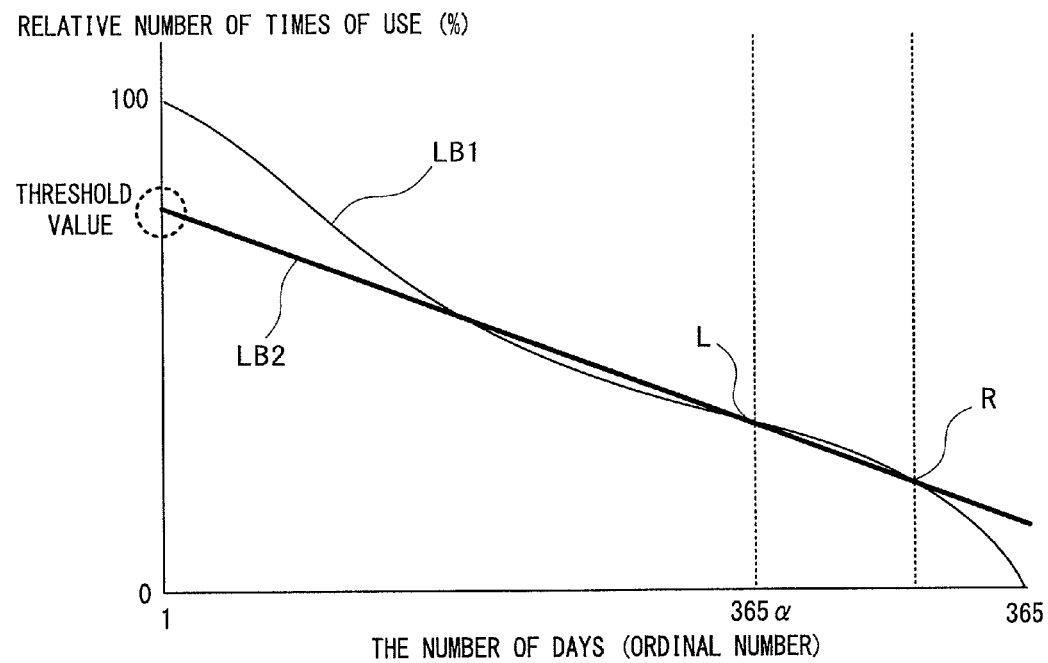

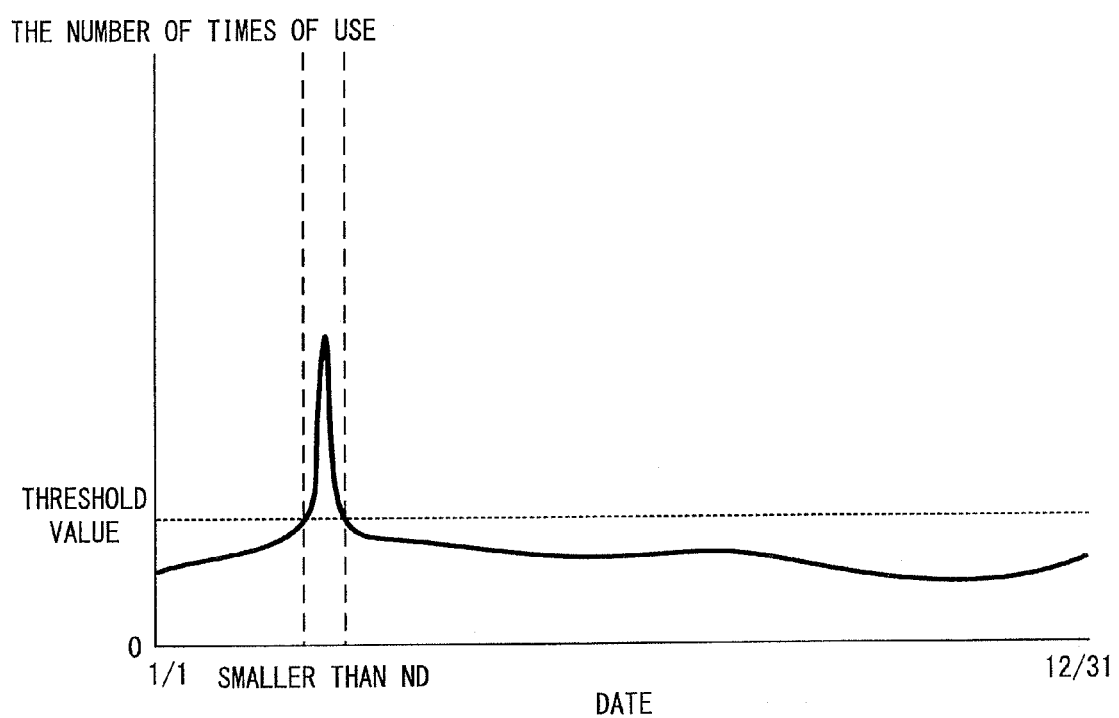

FIG.14A
MEMBER INFORMATION DB 12a

| USER ID |
|---|
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| . . . |

FIG.14B
ITEMS-FOR-SALE INFORMATION DB 12b

| ITEM ID |
|---|
| SHOP ID |
| PRODUCT CODE |
| CATEGORY ID |
| ITEM NAME |
| URL OF ITEM IMAGE |
| ITEM DESCRIPTION |
| ITEM PRICE |
| STOCK QUANTITY |
| . . . |

FIG.14C
PURCHASE INFORMATION DB 12c

| ITEM ID |
|---|
| SHOP ID |
| PRODUCT CODE |
| CATEGORY ID |
| DATE |
| THE NUMBER OF SALES |
| STOCK QUANTITY |

FIG.14D
NUMBER-OF-TIMES-OF-USE DB 12d

| KEYWORD |
|---|
| DATE |
| THE NUMBER OF TIMES OF USE |

FIG.14E
KEYWORD DB 12e

| KEYWORD |
|---|
| KEYWORD |
| . . . |

FIG.14F
KEYWORD-RELATED CATEGORY DB 12f

| KEYWORD |
|---|
| CATEGORY ID |

FIG.14G
HIGH SEASON INFORMATION DB 12g

| KEYWORD |
|---|
| PERIOD OF HIGH SEASON |

FIG.14H
KEYWORD GROUP INFORMATION DB 12h

| GROUP ID |
|---|
| CATEGORY ID |
| PERIOD OF HIGH SEASON |
| KEYWORD |
| KEYWORD |
| . . . |

INFORMATION PROCESSING APPARATUS, INFORMATION PROCESSING METHOD, INFORMATION PROCESSING PROGRAM, AND RECORDING MEDIUM

CROSS REFERENCE TO RELATED APPLICATIONS

This application is a National Stage of International Application No. PCT/JP2012/080434 filed Nov. 26, 2012, claiming priority based on Japanese Patent Application No. 2012-123727 filed May 30, 2012, the contents of all of which are incorporated herein by reference in their entirety.

TECHNICAL FIELD

The present invention relates to a technical field of an information processing apparatus and the like that identify a period of time in which use of a keyword is popular.

BACKGROUND ART

Conventionally, it is known that there are techniques which try to estimate popularity of things related to keywords on the basis of keywords used by users who use the Internet or the like. For example, these techniques count the number of times when a keyword is used to search for a web page or the like for each keyword and estimate the popularity of the keyword on the basis of the number of times when the keyword is used. For example, Patent Literature 1 describes a technique which detects a keyword that is not inputted during past counting periods but is newly inputted during a current counting period and which detects a keyword whose degree of change of the number of input times from a past counting period to the current counting period exceeds a predetermine range.

CITATION LIST

Patent Literature

Patent Literature 1: Japanese Patent Application Laid-Open No. 2003-6195

SUMMARY OF INVENTION

Technical Problem

Among keywords, there is a keyword which is popular during a certain period that appears in a cycle of one year, one month, one week, or the like. If the period in which such a keyword is popular can be identified, it is possible to forecast a period in which the keyword will be popular in the future. The technique described in Patent Literature 1 may be able to determine from when a keyword becomes popular. However, the technique described in Patent Literature 1 is a technique that performs detection from a local viewpoint, that is, a change from a certain counting period to another counting period. Therefore, it is not possible to determine that a period in which use of a certain keyword is popular is from when to when in a certain cycle period on the basis of a broader viewpoint.

The present invention is made in view of the above situation, and an object of the present invention is to provide an information processing apparatus, an information processing method, an information processing program, and a recording medium which can identify a period in which use of a certain keyword is popular from among periods that appear periodically.

Solution to Problem

In order to solve the above problem, the invention according to claim 1 is an information processing apparatus comprising: a threshold value determination means that determines a threshold value of a number of times of use of a keyword on the basis of the number of times of use of the keyword in each of unit periods included in a cycle period; a candidate identification means that identifies a period as a candidate for a popularity period in which the keyword is popular, the candidate being included in the cycle period and being a period in which the numbers of times of use exceeds the threshold value determined by the threshold value determination means; an exclusion means that excludes the period identified by the candidate identification means from the popularity period when a situation in which the numbers of times of use in the period identified by the candidate identification means exceeds the threshold value determined by the threshold value determination means is different from a situation based on a periodic popularity of the keyword; and a period determination means that determines the period identified by the candidate identification means to be the popularity period when the period identified by the candidate identification means is not excluded by the exclusion means.

According to the invention, the threshold value is determined based on the number of times of use of the keyword in each unit period included in the cycle period. Then, the period in which the numbers of times of use exceeds the threshold value is identified as the candidate for the popularity period. When a situation in which the numbers of times of use of the keyword in the unit periods in the identified period exceeds the threshold value is different from a situation based on the periodic popularity of the keyword, the identified period is excluded from the popularity period. Therefore, it is possible to identify a period in which use of a certain keyword is popular from among periods that appear periodically.

The invention according to claim 2 is the information processing apparatus according to claim 1, wherein the threshold value determination means determines the threshold value on the basis of the number of times of use to which an ordinal number is assigned, the ordinal number indicating a sequential position of the number of times of use in a plurality of numbers of times of use in the unit periods included in the cycle period, the plurality of numbers of times of use being arranged in descending order, the ordinal number corresponding to a predetermined ratio that is greater than an upper limit ratio of the popularity period to the cycle period.

In a distribution of the numbers of times of use in which the numbers of times of use of a keyword whose popularity period exists are arranged in descending order, a situation of a distribution of the numbers of times whose ordinal numbers indicate forward position is different from a situation of a distribution of the numbers of times whose ordinal numbers indicate backward position. The distribution of the numbers of times whose ordinal numbers indicate forward position can be considered to be the numbers of times of use in the unit periods included in a popularity period. Therefore, it is possible to distinguish between the numbers of times of use in the unit periods included in a popularity period and the numbers of times of use in the unit periods included in a period other than the popularity period from the difference of situations of the distribution of the numbers of times of use. According to the invention, the threshold value is determined on the basis of the numbers of times of use in a distribution in which the keyword is considered to be not popular. Therefore, it is possible to determine the threshold value according to the distribution of the numbers of times of use of the keyword which is considered to be not popular.

The invention according to claim 3 is the information processing apparatus according to claim 2, wherein the threshold value determination means determines a linear function to be the threshold value, the linear function being calculated by substituting the ordinal number corresponding to a ratio smaller than or equal to the upper limit ratio of the popularity period into a formula of the linear function, and the formula is determined so that when two of the ordinal numbers corresponding to respective two of the predetermined ratios are separately substituted into the formula, two linear function is separately calculated, each of the two linear function being equal to the number of times of use to which the substituted ordinal number is assigned.

According to the invention, a formula of a linear function representing a straight line is defined. The straight line passes through a point on the distribution where the keyword is considered to be not popular. The straight line indicates the rate of change of the number of times of use in this distribution by slope. When an ordinal number is substituted into the formula, the number of times of use which is determined to be the threshold value is calculated. This ordinal number is assigned to the number of times of use at which the keyword is considered to be popular. In the distribution of the numbers of times of use in which the numbers of times of use of a keyword whose popularity period exists are arranged in descending order, the rate of change of the numbers of times of use distributed in the forward position tends to be greater than the rate of change of the numbers of times of use distributed in a position other than the forward position. Therefore, if the popularity period exists, it must be that the distribution of the numbers of times of use at which the keyword is popular exceeds the straight line described above. Therefore, According to the invention, it is possible to accurately determine the threshold value.

The invention according to claim 4 is the information processing apparatus according to any one of claims 1 to 3, wherein on the basis of actual numbers of times of use and the threshold value determined by the threshold value determination means, the candidate identification means identifies a likely period as the period in which the numbers of times of use exceeds the threshold value by using dynamic programming.

According to the invention, it is possible to identify a candidate for the popularity period appropriately.

The invention according to claim 5 is the information processing apparatus according to any one of claims 1 to 4, wherein the exclusion means excludes the period identified by the candidate identification means from the popularity period when a protrusion degree is smaller than a predetermined first rate, the protrusion degree being a degree of protruding of the number of times of use in the identified period and being calculated based on the number of times of use in at least one of the unit periods included in the identified period and the threshold value determined by the threshold value determination means.

According to the invention, it is possible to exclude a period in which the numbers of times of use is not protruding enough to consider that the keyword is popular from the popularity period.

The invention according to claim 6 is the information processing apparatus according to any one of claims 1 to 5, wherein for at least a rate of change of the number of times of use at a beginning of the period identified by the candidate identification means among the rate of change of the number of times of use at the beginning and a rate of change of the number of times of use at an ending of the period identified by the candidate identification means, the exclusion means determines whether or not the rate of change is greater than a predetermined second rate, and the exclusion means excludes the identified period from the popularity period when the rate of change is greater than the predetermined second rate.

According to the invention, it is possible to exclude at least one of two periods from the popularity period. One of the two periods is a period in which the number of times of use rapidly increases because the number of times of use is affected by an unexpected event. The other of two periods is a period in which the number of times of use rapidly increases and decreases due to artificial increase of the number of times of use.

The invention according to claim 7 is the information processing apparatus according to any one of claims 1 to 6, wherein when the period identified by the candidate identification means is shorter than a predetermined length, the exclusion means excludes the identified period from the popularity period.

According to the invention, it is possible to exclude a period in which the number of times of use of a keyword temporarily increases regardless of the popularity of the keyword from the popularity period.

The invention according to claim 8 is the information processing apparatus according to any one of claims 1 to 7, further comprising: a grouping means that puts a second keyword different from a first keyword whose popularity period is identified by the period determination means into a keyword group to which the first keyword belongs when transition of the number of times of use of the first keyword is similar to transition of the number of times of use of the second keyword.

According to the invention, when the transition of the number of times of use of the second keyword is similar to the transition of the number of times of use of the first keyword, it is possible to identify the popularity period of the second keyword without identifying the popularity period of the second keyword on the basis of the threshold value. Further, it is possible to create a group of keywords related to each other.

The invention according to claim 9 is the information processing apparatus according to claim 8, wherein the grouping means does not put the second keyword into the group when a category to which the first keyword is related is different from a category to which the second keyword is related.

According to the invention, it is possible to create a group of keywords whose categories are the same. The category affects the popularity of the number of times of use.

The invention according to claim 10 is the information processing apparatus according to any one of claims 1 to 9, further comprising: a priority control means that controls priority of presentation of each of a plurality of keywords, each of the keywords including one or more characters inputted in a keyword input area by a user, wherein, on the basis of a relationship between the present time and the popularity period determined by the period determination means, the priority control means controls the priority of a keyword whose popularity period is identified.

According to the invention, it is possible to control the priority of presentation of keywords according to the popularity of the keywords.

The invention according to claim 11 is an information processing method performed by a computer, the method comprising: a threshold value determination step of determining a threshold value of a number of times of use of a keyword on the basis of the number of times of use of the keyword in each of unit periods included in a cycle period; a candidate identification step of identifying a period as a candidate for a popularity period in which the keyword is popular, the candidate being included in the cycle period and being a period in which the numbers of times of use exceeds the threshold value determined in the threshold value determination step; an exclusion step of excluding the period identified in the candidate identification step from the popularity period when a situation in which the numbers of times of use in the period identified in the candidate identification step exceeds the threshold value determined in the threshold value determination step is different from a situation based on a periodic popularity of the keyword; and a period determination step of determining the period identified in the candidate identification step to be the popularity period when the period identified in the candidate identification step is not excluded in the exclusion step.

The invention according to claim 12 is an information processing program that causes a computer to function as: a threshold value determination means that determines a threshold value of a number of times of use of a keyword on the basis of the number of times of use of the keyword in each of unit periods included in a cycle period; a candidate identification means that identifies a period as a candidate for a popularity period in which the keyword is popular, the candidate being included in the cycle period and being a period in which the numbers of times of use exceeds the threshold value determined by the threshold value determination means; an exclusion means that excludes the period identified by the candidate identification means from the popularity period when a situation in which the numbers of times of use in the period identified by the candidate identification means exceeds the threshold value determined by the threshold value determination means is different from a situation based on a periodic popularity of the keyword; and a period determination means that determines the period identified by the candidate identification means to be the popularity period when the period identified by the candidate identification means is not excluded by the exclusion means.

The invention according to claim 13 is a recording medium in which an information processing program is computer-readably recorded, the information processing program causing a computer to function as: a threshold value determination means that determines a threshold value of a number of times of use of a keyword on the basis of the number of times of use of the keyword in each of unit periods included in a cycle period; a candidate identification means that identifies a period as a candidate for a popularity period in which the keyword is popular, the candidate being included in the cycle period and being a period in which the numbers of times of use exceeds the threshold value determined by the threshold value determination means; an exclusion means that excludes the period identified by the candidate identification means from the popularity period when a situation in which the numbers of times of use in the period identified by the candidate identification means exceeds the threshold value determined by the threshold value determination means is different from a situation based on a periodic popularity of the keyword; and a period determination means that determines the period identified by the candidate identification means to be the popularity period when the period identified by the candidate identification means is not excluded by the exclusion means.

Advantageous Effects of Invention

According to the present invention, the threshold value is determined based on the number of times of use of the keyword in each unit period included in the cycle period. Then, the period in which the numbers of times of use exceeds the threshold value is identified as the candidate for the popularity period. When a situation in which the numbers of times of use of the keyword in the unit periods in the identified period exceeds the threshold value is different from a situation based on the periodic popularity of the keyword, the identified period is excluded from the popularity period. Therefore, it is possible to identify a period in which use of a certain keyword is popular from among periods that appear periodically.

BRIEF DESCRIPTION OF DRAWINGS

FIG. 1 is a diagram showing an example of a schematic configuration of an information processing system S according to an embodiment.

FIG. 2 is a flowchart showing an example of a schematic process of an online shopping mall server 1 according to the embodiment.

FIG. 5A is a diagram showing an example of a straight line for determining a threshold value of the graph in FIG. 3B and FIG. 5B is a diagram showing an example of a straight line for determining a threshold value of the graph in FIG. 4B.

FIG. 8 is a graph showing an example of a transition of the number of times of use of a keyword, whose period of a candidate for the high season is short, during one year.

FIG. 14A is a diagram showing an example of content registered in a member information DB 12*a*. FIG. 14B is a diagram showing an example of content registered in an items-for-sale information DB 12*b*. FIG. 14C is a diagram showing an example of content registered in a purchase information DB 12*c*. FIG. 14D is a diagram showing an example of content registered in number-of-times-of-use DB 12*d*. FIG. 14E is a diagram showing an example of content registered in a keyword DB 12*e*. FIG. 14F is a diagram showing an example of content registered in a keyword-related category DB 12*f*. FIG. 14G is a diagram showing an example of content registered in a high season information DB 12*g*. FIG. 14H is a diagram showing an example of content registered in a keyword group information DB 12*h*.

DESCRIPTION OF EMBODIMENT

Figure 3A:
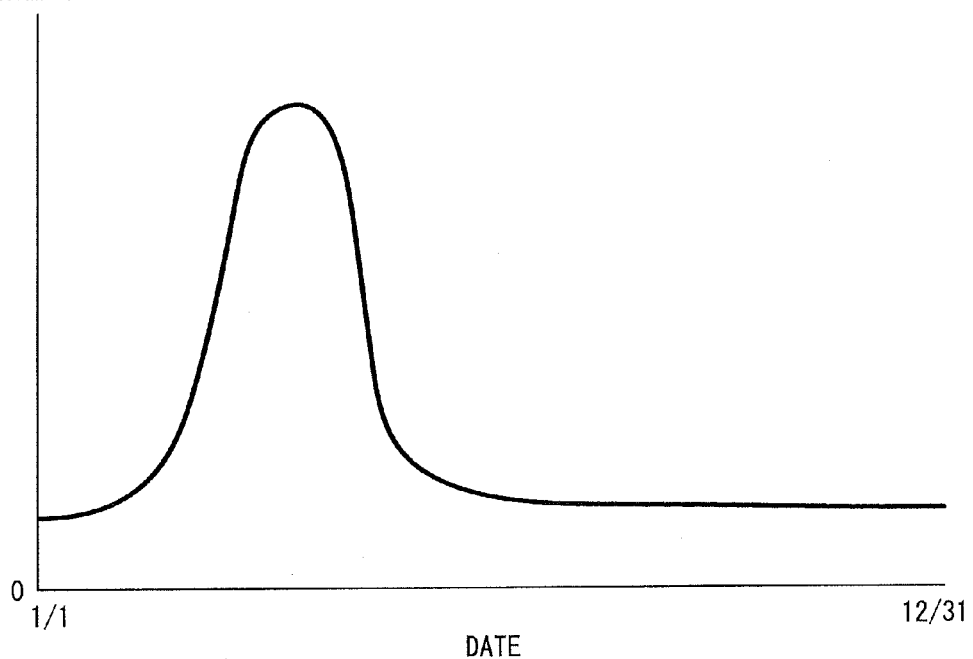
FIG. 3A is a graph showing an example of a transition of the number of times of use of a keyword, which is considered to have a high season, during one year

Hereinafter, an embodiment of the present invention will be described in detail with reference to the drawings. The embodiment described below is an embodiment where the present invention is applied to an information processing system.

1. Schematic Configuration and Function of Information Processing System

First, a configuration of an information processing system S according to the embodiment will be described with reference to FIG. 1. FIG. 1 is a diagram showing an example of a schematic configuration of the information processing system S according to the embodiment.

As shown in FIG. 1, the information processing system S includes an online shopping mall server 1, a management terminal 2, a plurality of shop terminals 3, and a plurality of user terminals 4. The online shopping mall server 1, each shop terminal 3, and each user terminal 4 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway. The online shopping mall server 1 and the management terminal 2 can transmit and receive data to and from each other through, for example, a LAN (Local Area Network).

The online shopping mall server 1 is a server device that performs various processes related to an online shopping mall from which items for sale can be purchased. The online shopping mall server 1 is an example of an information processing apparatus of the present invention. A user can purchase a desired item for sale from a desired shop by using the online shopping mall. For example, according to a request from the user terminal 4, the online shopping mall server 1 transmits a Web page of the online shopping mall and performs processes related to a search and a purchase of an item for sale. Conditions of the search (search condition) include a keyword and a category of item for sale. The category or item for sale is an example of a category of the present invention.

The management terminal 2 is a terminal device used by an administrator of the online shopping mall. For example, the administrator uses the management terminal 2 to operate the online shopping mall server 1 and acquire information from the online shopping mall server 1. For example, a personal computer is used as the management terminal 2.

The shop terminal 3 is a terminal device used by an employee or the like of a shop that is open in the online shopping mall. On the basis of an operation from an employee or the like, the shop terminal 3 accesses a server device such as the online shopping mall server 1. Thereby, the shop terminal 3 receives a web page from the server device and displays the web page. In the shop terminal 3, software such as a browser and an email client is installed. For example, by using the shop terminal 3, an employee registers information of an item for sale to be sold in the online shopping mall and checks content of order of an item for sale.

The user terminal 4 is a terminal device of a user who uses the online shopping mall. By accessing the online shopping mall server 1 on the basis of an operation from a user, the user terminal 4 receives a web page from the online shopping mall server 1 and displays the web page. The user inputs a search condition such as a keyword by operating the user terminal 4. In the user terminal 4, software such as a browser and an email client is installed. For example, a personal computer, a PDA (Personal Digital Assistant), a mobile information terminal such as a smartphone, and a mobile phone are used as the user terminal 4.

2. Determination of Recurrent Keyword and Identification of High Season

Next, a determination method of a recurrent keyword and an identification method of a high season will be described with reference to FIGS. 2 to 9.

2-1 Outline

The online shopping mall server 1 determines whether or not use of a certain keyword becomes popular in a one year cycle as a search condition for searching for an item for sale in the online shopping mall. A keyword which periodically becomes popular to be used as a search condition is referred to as a "recurrent keyword". The online shopping mall server 1 identifies a period in which use of the recurrent keyword is popular. This period is referred to as a "high season". It can be said that the high season is a period in which the use of the recurrent keyword is concentrated in one year. The period other than the high season in one year is referred to as an "off season". Basically, the online shopping mall server 1 extracts a recurrent keyword whose high season appears in a one year cycle. However, the online shopping mall server 1 may determine a keyword whose high season appears a plurality of times in one year to be a recurrent keyword as a result. To determine the recurrent keyword and identify the high season, the online shopping mall server 1 counts the number of times of use (use frequency) of a keyword which was used as a search condition for each day for each keyword. A period of one year from January 1 to December 31 is an example of a cycle period of the present invention. One day is an example of a unit period of the present invention. The high season is an example of a popularity period of the present invention.

FIG. 2 is a flowchart showing an example of a schematic process of the online shopping mall server 1 according to the embodiment. As shown in FIG. 2, the online shopping mall server 1 determines a threshold value of the number of times of use of a keyword to be determined whether or not to be a recurrent keyword (step S1). The keyword to be determined whether or not to be a recurrent keyword is referred to as a "target keyword". In one year, the high season is identified from among periods where the number of times of use in each day exceeds the threshold value. The online shopping mall server 1 calculates the threshold value on the basis of a distribution of the number of times of use during one year.

Next, the online shopping mall server 1 identifies periods to be a candidate for the high season (high season candidate) in one year (step S2). The online shopping mall server 1 determines a period, in which days where the numbers of times of use exceeds the threshold value continue, to be a candidate for the high season. Here, the online shopping mall server 1 adjusts a period in which the number of times of use exceeds the threshold value by using dynamic programming.

Next, the online shopping mall server 1 excludes periods which are inappropriate as the high season from the candidates for the high season (step S3). The inappropriate periods are noise of information. The inappropriate periods include a too short period, a period in which the number of times of use is not protruding, a period in which the number of times of use is affected by an unexpected event, and a period in which the number of times of use is artificially increased.

As a result of the process of step S3, if there is a period which is not excluded from the candidates, the online shopping mall server 1 determines that the target keyword is the recurrent keyword. Further, the online shopping mall server 1 determines that the period which is not excluded from the candidates is the high season. The details of each step will be described later.

2-2. Determination of Threshold Value

Next, the determination method of the threshold value in step S1 will be described.

Figure 3B:
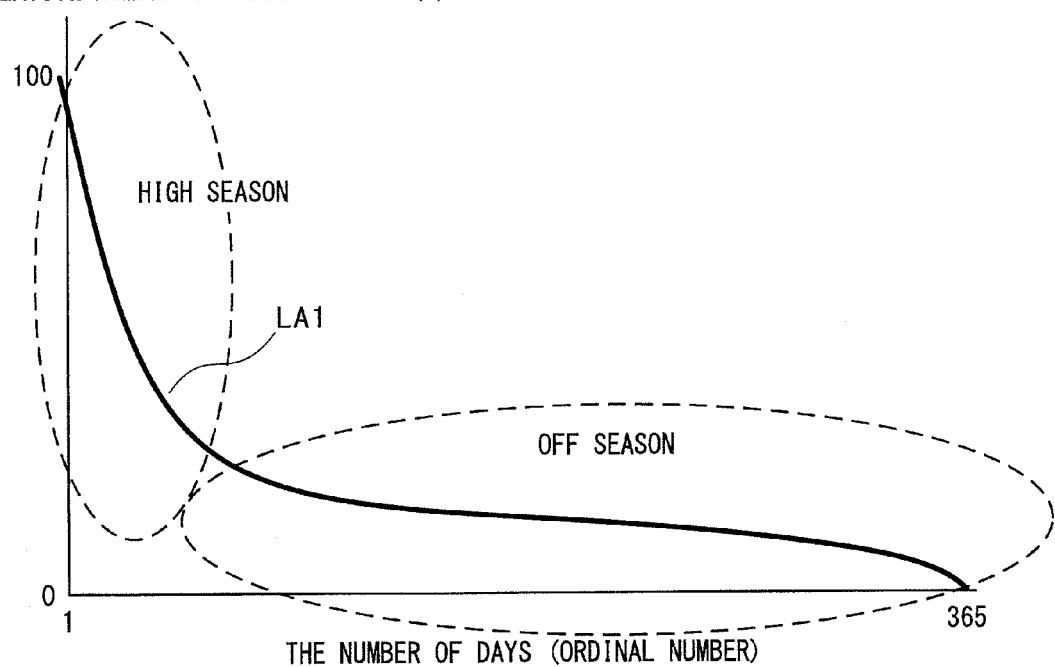
FIG. 3B is a graph showing an example of a distribution of the number of times of the use.

FIG. 3A is a graph showing an example of a transition of the number of times of use of a keyword, which is considered to have a high season, during one year. FIG. 3B is a graph showing an example of a distribution of the number of times of the use. As an example of the keyword which is considered to have a high season, a keyword related to an event that takes place once a year is considered. For example, "Christmas" is a keyword which is considered to have a high season. FIG. 3A is a graph showing a transition of the number of times of use of a keyword which is considered to have a high season. When 365 day's numbers of times of use which change as shown in FIG. 3A are arranged in descending order, a graph LA1 of a distribution as shown in FIG. 3B is obtained. In FIG. 3B, the x coordinate indicates an ordinal number which represents a sequential position of the number of times in the arranged numbers of times. The ordinal number corresponds to the number of days. The number of days is a cardinal number. Specifically, when the m-th number of times of use is n, the number of times of use is greater than or equal to n in m days in one year. The number of days indicates the x coordinate in the distribution of the numbers of times of use. In FIG. 3B, the y coordinate indicates the relative number of times of use. The greatest number of times of use in one year is 100% of the relative number of times of use. Therefore, the first relative number of times of use is 100%. On the other hand, the smallest number of times of use in one year is 0% of the relative number of times of use. Therefore, the 365th relative number of times of use is 0%.

From the distribution shown in FIG. 3B, it is possible to distinguish between a rough range of the number of times of use in days included in the high season and a rough range of the number of times of use in days included in the off season. Specifically, when the number of days is small (that is, the ordinal number indicates a forward position), the rate of decrease of the number of times of use is relatively great with respect to the increase of the number of days. In other words, the slope of the graph LA1 is great. The rate of decrease of the number of times of use in the distribution of the number of times of use is referred to as a "rate of decrease". The rate of decrease may be small around one day. However, as the number of days increases, the rate of decrease immediately increases. When the number of days is small, the rate of decrease does not change so much. The rate of decrease gradually decreases between around 40 days and 80 days. Thereafter, the rate of decrease does not change so much. Therefore, in the graph LA1, there are a range in which the rate of decrease is relatively great (0 to around 60 days) and a range in which the rate of decrease is relatively small (around 60 days to 365 days). We consider that the number of times of use in the range in which the rate of decrease is great is the number of times of use in the high season and the number of times of use in the range in which the rate of decrease is small is the number of times of use in the off season.

Figure 4A:
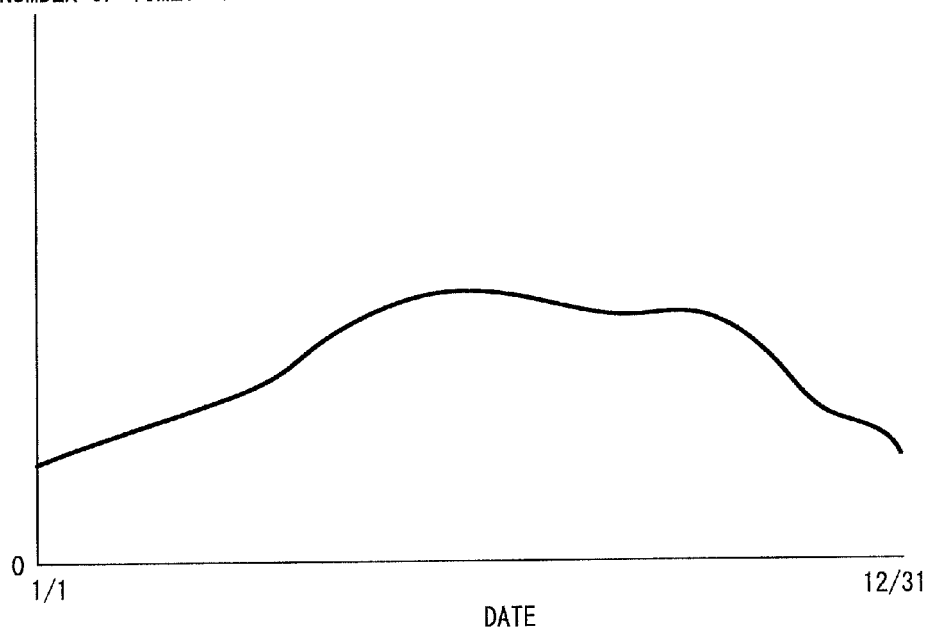
FIG. 4A is a graph showing an example of a transition of the number of times of use of a keyword, whose number of times of use does not change so much, during one year
Figure 4B:
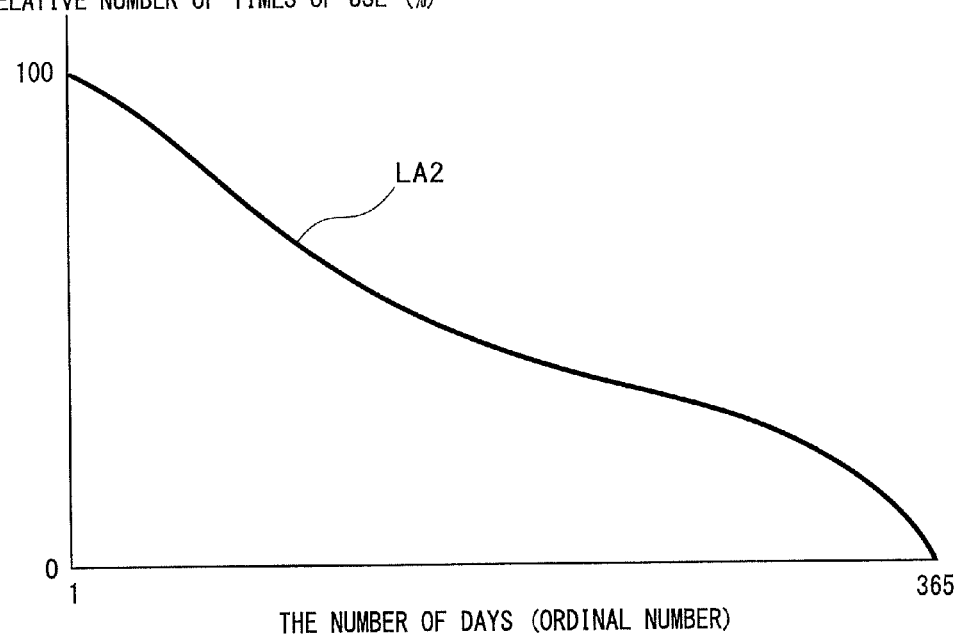
FIG. 4B is a graph showing an example of a distribution of the number of times of the use.

FIG. 4A is a graph showing an example of a transition of the number of times of use of a keyword, whose number of times of use does not change so much, during one year. FIG. 4B is a graph showing an example of a distribution of the number of times of the use. When the number of times of use does not change so much during one year, we consider that there is no period in which the keyword is popular. When 365 day's numbers of times of use which change as shown in FIG. 4A are arranged in descending order, a graph LA2 of a distribution as shown in FIG. 4B is obtained. From the distribution shown in FIG. 4B, it is not possible to distinguish between a range of the number of times of use in days included in the high season and a range of the number of times of use in days included in the off season. Or, it is difficult to distinguish between the ranges. The reason of this is because the change of the rate of decrease is small as a whole.

From the result described above, it is assumed that the numbers of times of use in days included in the high season is determined by comparing the numbers of times of use with the number of times of use in days included in the off season. Regardless of whether or not the high season of the target keyword exists, the numbers of times of use in days included in the off season are the numbers of times of use in a period which is not considered to be the high season. When there is no high season, the entirety of the one year is the off season. Based on the assumption, the online shopping mall server 1 calculates the threshold value of the number of times of use on the basis of a distribution of the number of times of use in the off season.

FIG. 5A is a diagram showing an example of a straight line for determining the threshold value of the graph in FIG. 3B. If the target keyword is a recurrent keyword, a ratio P that can be considered to be the upper limit of the ratio of the number of days that can be included in a high season to 365 days is defined. The high season is a part of the period of one year, so that P satisfies $0<P<1$. In the embodiment, it is defined that $P=0.5$. Further, two ratios $\alpha$ and $\beta$ greater than P are determined. Here, $\alpha$ and $\beta$ satisfy $P<=\alpha<\beta<=1$. Further, $\alpha$ and $\beta$ are examples of predetermined ratios in the present invention. Next, $\alpha$ quantile and $\beta$ quantile are identified in the distribution of the number of times of use. The $\alpha$ quantile is the number of times of use $N\alpha$ corresponding to $(365\times\alpha)$ days. The $\beta$ quantile is the number of times of use $N\beta$ corresponding to $(365\times\beta)$ days. Since a and are greater than P, each of $N\alpha$ and $N\beta$ is the number of times of use in a day included in the off season. The intersection between the graph LA1 and a straight line represented by a formula $x=365\times\alpha$ is defined as L. Further, the intersection between the graph LA1 and a straight line represented by a formula $x=365\times\beta$ is defined as R. In other words, the coordinates of the point L is $(365\times\alpha, N\alpha)$ and the coordinates of the point R is $(365\times\beta, N\beta)$. Then, as shown in FIG. 5A, the straight line LA2 that passes through the points L and R is defined. The straight line LA2 is represented by the following linear function formula.

$$y = ax + b$$

Here, a and b are calculated by the following formulas.

$$a = (N\beta - N\alpha)/(\beta - \alpha)$$

$$b = N\alpha - a \times \alpha$$

Then, a value of y calculated when a value x is 1 becomes the threshold value of the number of times of use.

The reason for determining the threshold value in this way will be described. As described above, in the distribution of the number of times of use of a keyword which can be considered to have the high season, the rate of decrease does not change so much in a range of the off season. Therefore, the slope of the straight line LA2 that passes through the points L and R represents the rate of decrease in the off season. There is a great difference between a maximum rate of decrease in a range of the high season and an average rate of decrease in a range of the off season. Therefore, we consider that the graph LA1 needs to be higher than the straight line LA2 in the number of times of use in a range smaller than ($365 \times \alpha$) days and thereby there is a possibility that the numbers of times of use in the high season exist. However, a point at which the graph LA1 exceeds the straight line LA2 in the number of times of use in the leftward direction in FIG. 5A is not necessarily a start point of an area of the high season. The reason of this is because the difference between the slope of the graph LA1 and the slope of the straight line LA2 is small at this time point. We consider that the start point of the area of the high season is in a more left area where the rate of decrease becomes greater than the rate of decrease in the off season by a certain amount. In other word, we consider that the start point of the area of the high season is around an area where the difference between the slope of the graph LA1 and the slope of the straight line LA2 increases to some extent.

Here, we consider it can be considered that the slower the change of the slope of the graph LA1, the more days are required in the leftward direction in order to reach the start point of the area of the high season. On the other hand, we consider that the slower the change of the slope of the graph LA1, the longer the distance between the intersection between the graph LA1 and the straight line LA2 in a range smaller than ($365 \times \alpha$) days and the y axis. Therefore, we assume that the number of times of use around the intersection between the straight line LA2 and the y axis is the number of times of use in an area where the difference between the slope of the graph LA1 and the slope of the straight line LA2 increases to some extent. Further, we consider that the maximum value of the number of times of use when there is a high season is required to exceed the number of times of use at the intersection between the straight line LA2 and the y axis. The reason of this is because if there is no area where the graph LA1 is higher than the straight line LA2 in the number of times of use in a range smaller than ($365 \times \alpha$) days, we consider that it is obvious that there is no high season. We assume that the number of times of use at the intersection between the straight line LA2 and the y axis is the maximum value of the number of times of use when there is no high season. The reason of this is because the first number of times of use when the numbers of times of use are distributed along the slope of the straight line LA2 is the number of times of use at the intersection between the straight line LA2 and the y axis. As described above, the first number of times of use is the maximum value of the number of times of use. Therefore, a condition for a certain day to be included in the high season is that the number of times of use in the day exceeds the maximum value of the number of times of use when no high season is assumed to be present.

When the online shopping mall server 1 determines the threshold value by using the method described above, the online shopping mall server 1 can determine an appropriate threshold value by simple processing. Therefore, it is possible to reduce the processing load of the online shopping mall server 1.

An administrator can arbitrarily determine values of P, $\alpha$, and $\beta$. For example, the administrator can set ratios considered to be appropriate on the basis of information of the numbers of times of use which are actually obtained. However, it is preferable that $\beta$ is smaller than 1. The reason of this is because the minimum value of the number of times of use changes significantly by the information of the numbers of times of use which are actually obtained. In other words, this is because there is a probability that the minimum value of the number of times of use is inappropriate as the information to determine the threshold value. When the online shopping mall server 1 actually identifies the high season, a ratio of the high season to one year may exceed the ratio P.

The online shopping mall server 1 may calculate the intercept b of the linear function formula and determine the intercept b as the threshold value instead of calculating the number of times of use by substituting 1 for the variable x in the linear function formula. Or, the online shopping mall server 1 may calculate the number of times of use by substituting the number of days corresponding to a predetermined ratio smaller than or equal to P for the variable x. The reason of this is because the threshold value exceeds at least $N\alpha$.

FIG. 5B is a diagram showing an example of a straight line for determining the threshold value of the graph in FIG. 4B. When the change of the number of times of use during one year is small, as shown in FIG. 4B, the threshold value is relatively high with respect to the number of times of use.

2-3. Identification of Candidate for the High Season

Next, the identification method of the candidate for the high season in step S2 will be described.

Figure 6A:
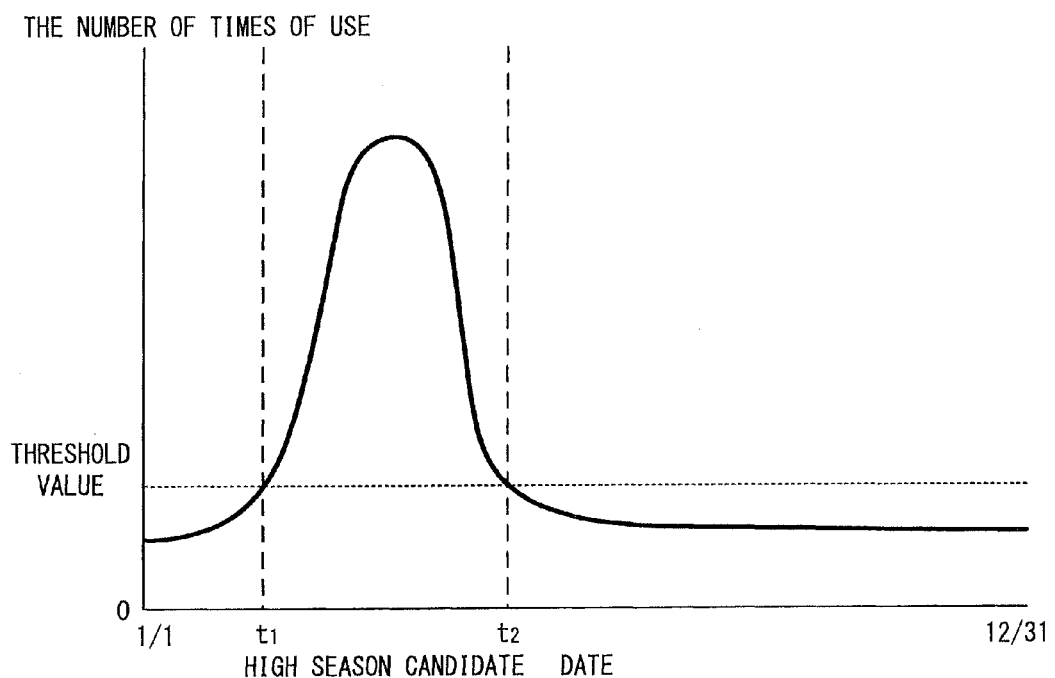
FIG. 6A is diagram showing an example of a candidate of a high season in the graph in FIG. 3A
Figure 6B:
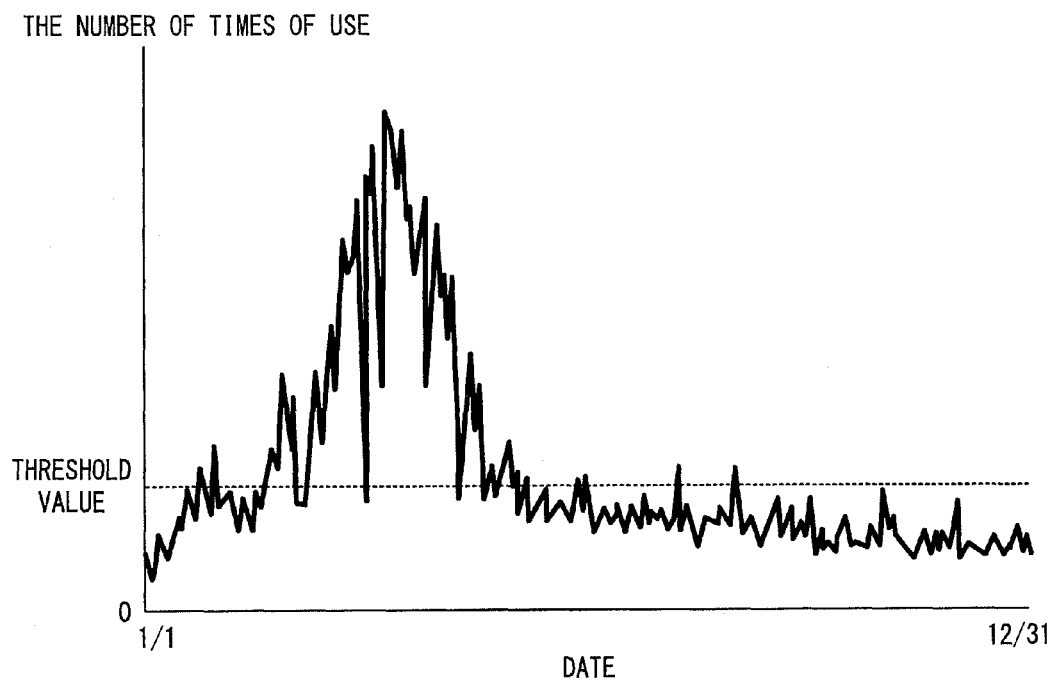
FIG. 6B is a graph showing an example of a transition of the number of times of use of a keyword during one year.

FIG. 6A is a diagram showing an example of the candidate for the high season on the graph in FIG. 3A. FIG. 6B is a graph showing an example of a transition of the number of times of use of a keyword during one year.

As shown in FIG. 6A, in one year, the online shopping mall server 1 identifies the period in which the number of times of use exceeds the threshold value determined in step S1 and determines the identified period to be the candidate for the high season. However, an actual graph of the transition of the number of times of use is not such a smooth curve as shown in FIG. 6A. The actual transition of the number of times of use goes up and down repeatedly. Therefore, as shown in FIG. 6B, there is a case in which the number of times of use repeatedly exceeds the threshold value and instantly falls below the threshold value or the number of times of use repeatedly falls below the threshold value and instantly exceeds the threshold value. As a result, a plurality of short periods may be identified as the candidates for the high season. It is inappropriate to identify these short periods as the high seasons separately. In order to identify the high season that appears in a one year cycle, it is necessary to see the transition of the number of times of use from a broader viewpoint. Therefore, the online shopping mall server 1 adjusts the period in which the number of times of use exceeds the threshold value by using dynamic programming.

Specifically, the online shopping mall server 1 uses Viterbi algorithm. Here, a sequence of actually observed events is a sequence of a state whether or not the number of times of use exceeds the threshold value. On the other hand, a sequence of hidden events is a sequence of a state whether or not it is the high season. As described above, basically, a period in which the numbers of times of use exceeds the threshold value is the high season. However, even in a period in which use of a keyword is popular, there is a case in which the actual number of times of use fluctuates and thereby the number of times of use temporarily becomes smaller than or equal to the threshold value. The same goes for the off season. The online shopping mall server 1 retrieves the most likely sequence of hidden events from the sequences of observed events.

Figure 7A:
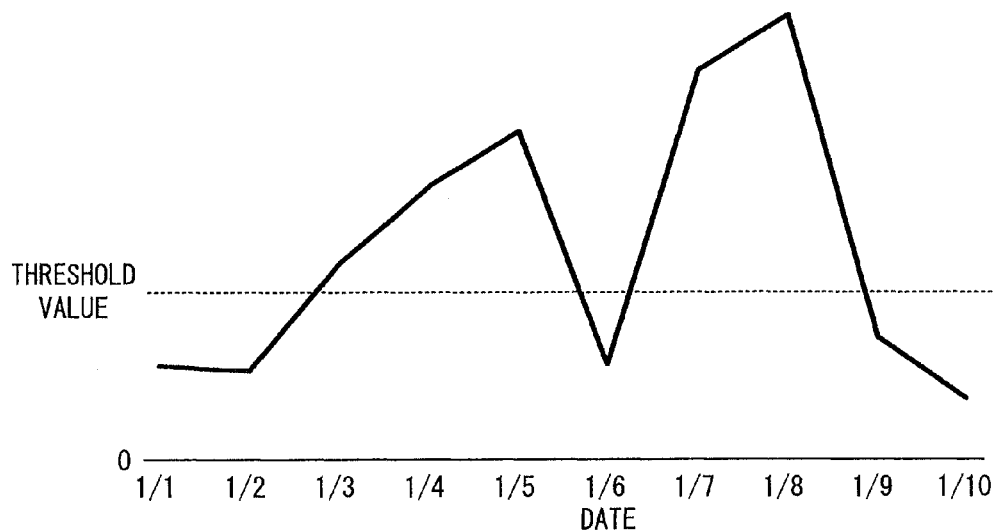
FIG. 7A is a graph showing an example of a transition of the number of times of use of a keyword during ten days.
Figure 7B:
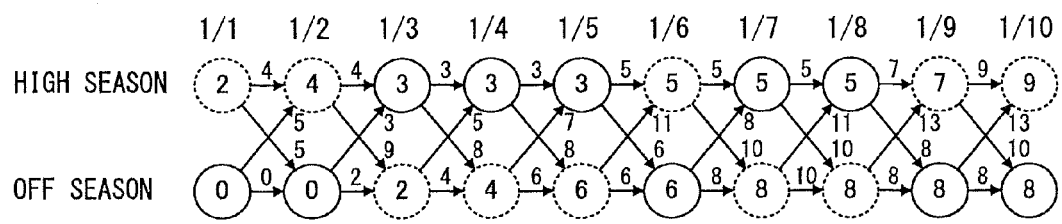
FIG. 7B is a diagram showing a calculation method of a transition cost in a trellis diagram from January 1 to January 10.

FIG. 7A is a graph showing an example of a transition of the number of times of use of a keyword during 10 days. The online shopping mall server 1 classifies each days of one year into a state in which the number of times of use exceeds the threshold value and a state in which the number of times of use does not exceed the threshold value. The state in which the number of times of use exceeds the threshold value is referred to as a "high season state". The state in which the number of times of use does not exceed the threshold value is referred to as a "off season state". In the example in FIG. 7A, in an observed state, in a period from January 1 to January 10, January 3 to January 5, January 7, and January 8 are in the high season state. The online shopping mall server 1 calculates state transition costs from January 1 to December 31. FIG. 7B is a diagram showing a calculation method of transition cost on a trellis diagram from January 1 to January 10. In FIG. 7B, the solid line circles indicate an observed state and the dotted line circles indicate an unobserved state.

When a state of a certain day transits to a state of the next day, if the state transits to an actually unobserved state, 2 points is added to the transition cost. If the state transits to a different state, 3 points is added to the transition cost. For example, the high season state of January 1 is an unobserved state, so that the transition cost at this time is 2 points. On the other hand, the transition cost of the off season state of January 1 is 0 point. When the high season state of January 1 transits to the high season state of January 2, 2 points is added to 2 points as the transition cost, so that the transition cost becomes 4 points. When the off season state of January 1 transits to the high season state of January 2, 2 points and 3 points are added to 0 point as the transition cost, so that the transition cost becomes 5 points. The smaller transition cost of 4 and 5 points becomes the transition cost of the high season state of January 2. When the high season state of January 1 transits to the off season state of January 2, the 3 points is added to 2 points as the transition, so that the transition cost becomes 5 points. When off season state of January 1 transits to the off season state of January 2, the transition cost 0 point does not change. Therefore, the transition cost of the off season state of January 2 is 0 point. The calculation result of transition costs of each state is as shown in FIG. 7B.

Figure 7C:
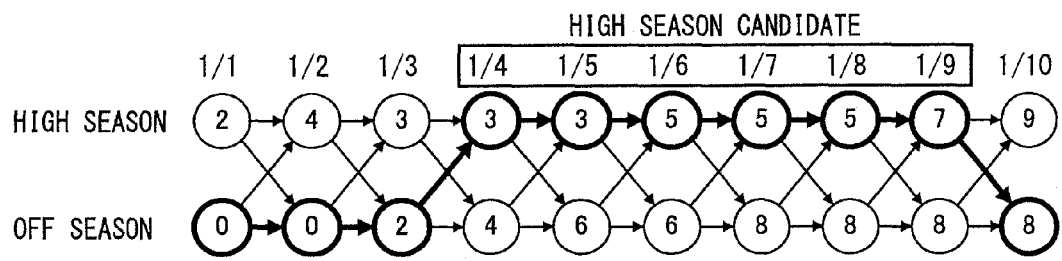
FIG. 7C is a diagram showing a likely state in the trellis diagram.

The online shopping mall server 1 selects a state of smaller transition cost from the high season state and the off season state of the same day as a likely state. FIG. 7C is a diagram showing a likely state on a trellis diagram. As shown in FIG. 7C, the likely state of January 1 to January 3 and January 10 is the off season state. On the other hand, the likely state of January 4 to January 9 is the high season state. Therefore, the online shopping mall server 1 identifies January 4 to January 9 as a candidate for the high season.

2-4. Exclusion of Inappropriate Period

Next, the exclusion method of periods of a candidate for the high season in step S3 will be described. When a situation in which the numbers of times of use exceed the threshold value in a period of a candidate for the high season is different from a situation in which the numbers of times of use exceed the threshold value in a high season when a keyword periodically becomes popular, the online shopping mall server 1 excludes the period of the candidate from the high season. As the situation in which the numbers of times of use exceed the threshold value, for example, there are the length of the period in which the number of times of use exceeds the threshold value, the degree of protruding of the number of times of use from the threshold value, and a way in which the number of times of use exceeds the threshold value. The online shopping mall server 1 may use at least one method from the exclusion methods described below.

2-4-1. Exclusion of Short Period

As one of the reasons of the high season appearing periodically, we consider that an event related to a keyword occurs periodically. There is a probability that the period when such an event occurs is known by a user. Therefore, the high season can be considered to be a period that continues to some extent. The reason of this is because the period in which the event occurs is long. Also, this is because even if the period in which the event occurs is short, there is a probability that the keyword related to the event is often used in at least either one of a period somewhat before the event occurs and a period somewhat after the event occurs. For example, a user who plans to purchase a Christmas present may search for an item for sale by using a keyword "Christmas" somewhat before the Christmas. On the other hand, even in a period other than the high season, there is a case in which the number of times of use temporarily increases without any special reason. FIG. 8 is a graph showing an example of a transition of the number of times of use of a keyword, whose period of a candidate for the high season is short, during one year. Therefore, the online shopping mall server 1 excludes a short period of candidates for the high season from the high season. Here, a minimum number of days ND is determined in advance. An administrator can arbitrarily determine the value of ND. The start day and the end day of the candidate for the high season are defined as $t_1$ and $t_2$ respectively. When $t_1$ and $t_2$ satisfies $t_2-t_1<ND$, the period of the candidate is excluded from the high season. ND is an example of a preset length in the present invention.

2-4-2. Exclusion of Period in which the Number of Times of Use is not Protruding Even in a case of a keyword which does not have a high season, the number of times of use fluctuates to some extent during one year. Therefore, the number of times of use may exceed the threshold value. However, as shown in FIG. 4A, the number of times of use in a period of a candidate for the high season is not so much greater than the number of times of use in other periods. A period in which use of a keyword is popular can be considered to be a period in which the number of times of use is significantly greater than the number of times of use in other periods. Therefore, the online shopping mall server 1 calculates the degree of protruding of the number of times of use on the basis of the number of times of use in a period of the candidate for the high season and the threshold value of the number of times of use. The degree of protruding of the number of times of use is referred to as a "protrusion degree". When the number of times of use is not protruding, the online shopping mall server 1 excludes the candidate for the high season from the high season.

Figure 9:
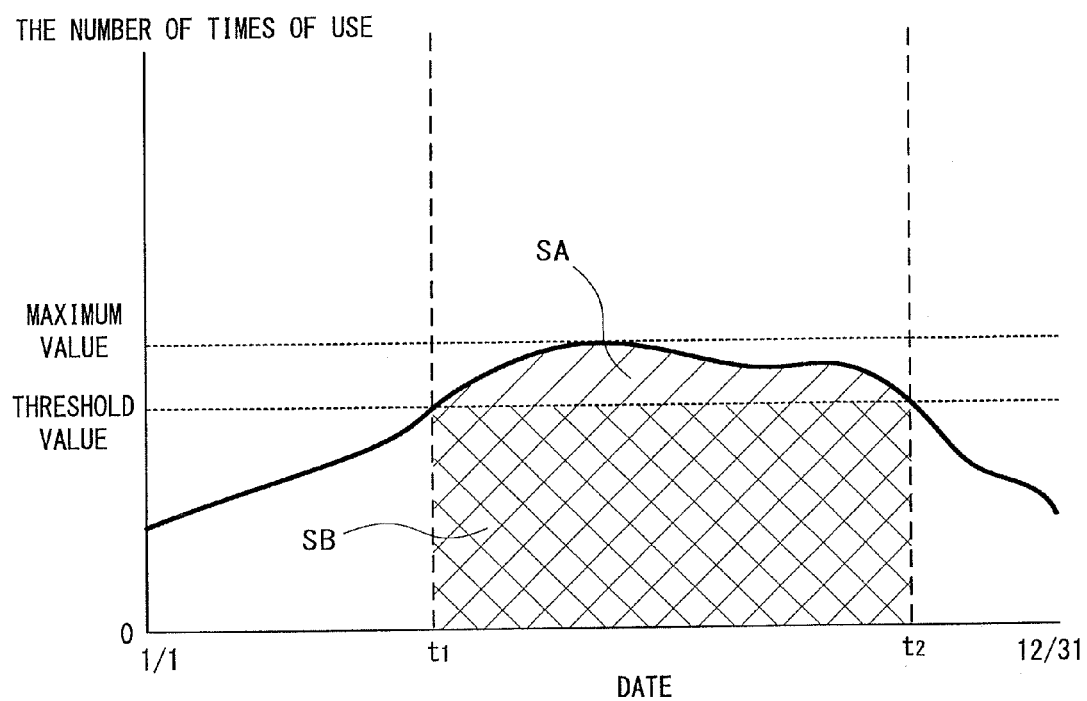
FIG. 9 is a diagram showing an example of a candidate for the high season on the graph in FIG. 4A.

Specifically, the condition of the protrusion degree is defined for each of a total number of times of use of a keyword and the maximum value of the number of times of use. FIG. 9 is a diagram showing an example of a candidate for the high season on the graph in FIG. 4A. The formula 1 below represents the condition related to the total number of times of use and the formula 2 represents the condition related to the maximum value of the number of times of use.

$$\frac{\sum_{t_1}^{t_2} SV(t,k)}{H(k)(t_2-t_1)} < PSN1 \qquad \text{[Mathematical Formula 1]}$$

In the formula 1, SV(t, k) is the number of times of use of a keyword k on date t. Therefore, the numerator of the formula 1 is the total number of times of use (integrated value) in a period of a candidate for the high season. In other words, the numerator of the formula 1 is the size of the region SA shown in FIG. 9. H(k) is the threshold value of the number of times of use of the keyword k. In other words, the denominator of the formula 1 is the size of the region SB shown in FIG. 9. PNS1 is a predetermined lower limit of the protrusion degree.

$$\frac{\text{Max}(SV(t,k) \mid t_1 \le t \le t_2)}{H(k)} < PSN2 \qquad \text{[Mathematical Formula 2]}$$

Max $(d_1, d_2 \ldots d_n)$ is the maximum value among $d_1$ to $d_n$. Therefore, the numerator of the formula 2 is the maximum value of the number of times of use in one day during a period of a candidate for the high season. PNS2 is a predetermined lower limit of the protrusion degree. When a period of a candidate for the high season satisfies both the formula 1 and the formula 2, the online shopping mall server 1 excludes the period from the high season. In other words, when the number of times of use in the period of the candidate is not so much protruding as a whole and the peak of the number of times of use is not so much protruding, the period is excluded from the high season. The administrator can arbitrarily determine PNS1 and PNS2. Each of PNS1 and PNS2 are an example of a first rate of the present invention. The online shopping mall server 1 may use only one of the formula 1 and the formula 2.

Figure 10A:
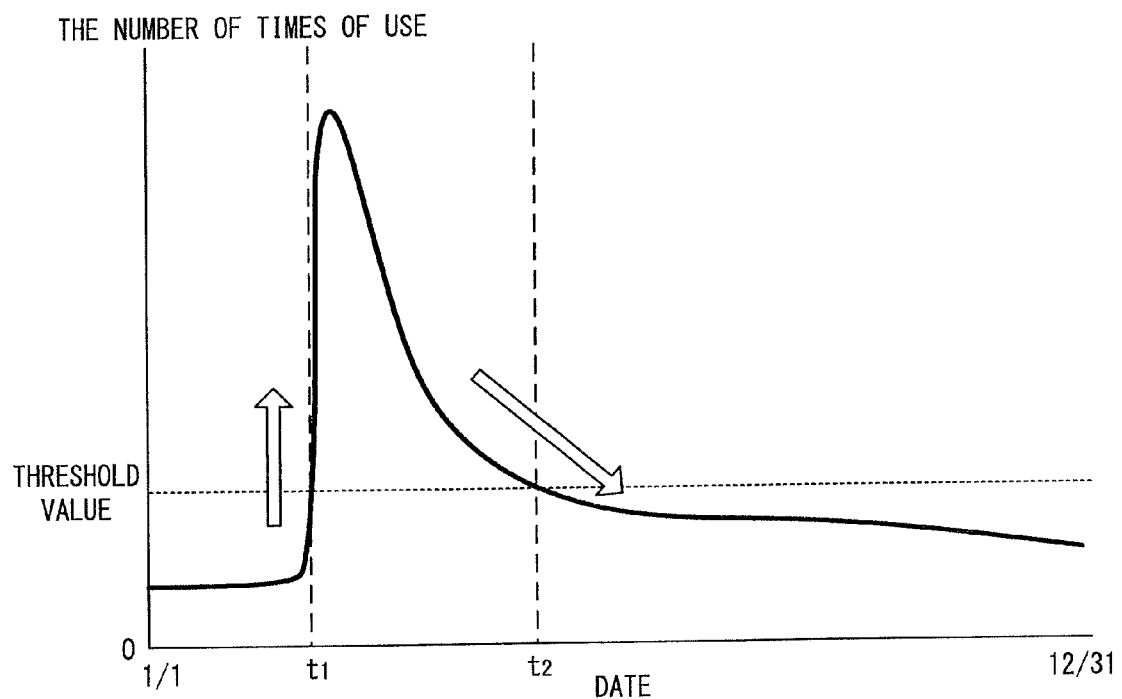
FIG. 10A is a graph showing an example of a transition of the number of times of use of a keyword, whose number of times of use is affected by an unexpected event, during one year.

2-4-3. Exclusion of Period in which the Number of Times of Use is Affected by Unexpected Event An unexpected event is, for example, an event which no one can predict until the event occurs. Examples of the unexpected event include disaster, accident, and incident. FIG. 10A is a graph showing an example of a transition of the number of times of use of a keyword, whose number of times of use is affected by an unexpected event, during one year. The number of times of use of a keyword related to an unexpected event increases immediately after the event occurs. The unexpected event does not occur periodically thereafter. Therefore, the period in which the number of times of use is affected by an unexpected event is not the high season.

The greater the influence an unexpected event has on society, the more significantly the number of times of use of a keyword related to the event increases. Therefore, as shown in FIG. 10A, when the period of a candidate for the high season begins, the number of times of use increases significantly. Here, the rate of change of the number of times of use in a transition of the number of times of use is referred to as a "change rate". When the number of times of use is affected by an unexpected event, the change rate of the number of times of use when the number of times of use exceeds the threshold value is greater than that in a case in which there is a high season as shown in FIG. 6A. On the other hand, as shown in FIG. 10A, in a case in which the number of times of use is affected by an unexpected event, when the period of a candidate for the high season ends, the change rate may not be as great as that at the beginning of the period. Therefore, the online shopping mall server 1 calculates the change rate of the number of times of use at the beginning of the period of the candidate for the high season. When the change rate is great, the online shopping mall server 1 excludes the candidate for the high season from the high season. The following formula 3 represents the condition of the change rate.

$$\frac{SV(t_1,k)}{H(k)} > CES1 \qquad \text{[Mathematical Formula 3]}$$

In the formula 3, CES1 is a predetermined upper limit of the change rate. Basically, $SV(t_1, k) > H(k)$ and $SV(t1-1, k) <= H(k)$. Therefore, the left-hand side of the formula 3 can be assumed to be the change rate of the number of times of use. When a period of a candidate for the high season satisfies the formula 3, the period is excluded from the high season. However, the period of a candidate for the high season is adjusted by the dynamic programming. Therefore, the number of times of use ($SV(t_1, k)$) at the beginning of the actual period is not necessarily greater than the threshold value (H(k)). Further, the number of times of use on the first day ($t_1$) of the period is not necessarily significantly greater than the threshold value. Therefore, one more condition of the change rate is defined by the following formula 4.

$$\frac{\text{Max}(SV(t_1,k), SV(t_1+1,k), SV(t_1+2,k))}{\text{Min}(SV(t_1-1,k), SV(t_1-2,k), SV(t_1-3,k))} > CES2 \qquad \text{[Mathematical Formula 4]}$$

In the formula 4, Min $(d_1, d_2 \ldots d_n)$ is the minimum value among $d_1$ to $d_n$. CES2 is a predetermined upper limit of the change rate. The administrator can arbitrarily determine CES1 and CES2. CES1 and CES2 may be the same value. The numerator of the left-hand side of the formula 4 is the maximum value of the number of times of use in each of three days immediately after the beginning of the period. The denominator of the left-hand side of the formula 4 is the minimum value of the number of times of use in each of three days immediately before the beginning of the period. The administrator can arbitrarily determine how many days of the number of times of use to be used immediately before the beginning of the period and immediately after the beginning of the period.

When a period of a candidate for the high season satisfies at least either one of the formula 3 and the formula 4, the online shopping mall server 1 excludes the period from the high season. The online shopping mall server 1 may use only the formula 4.

Figure 10B:
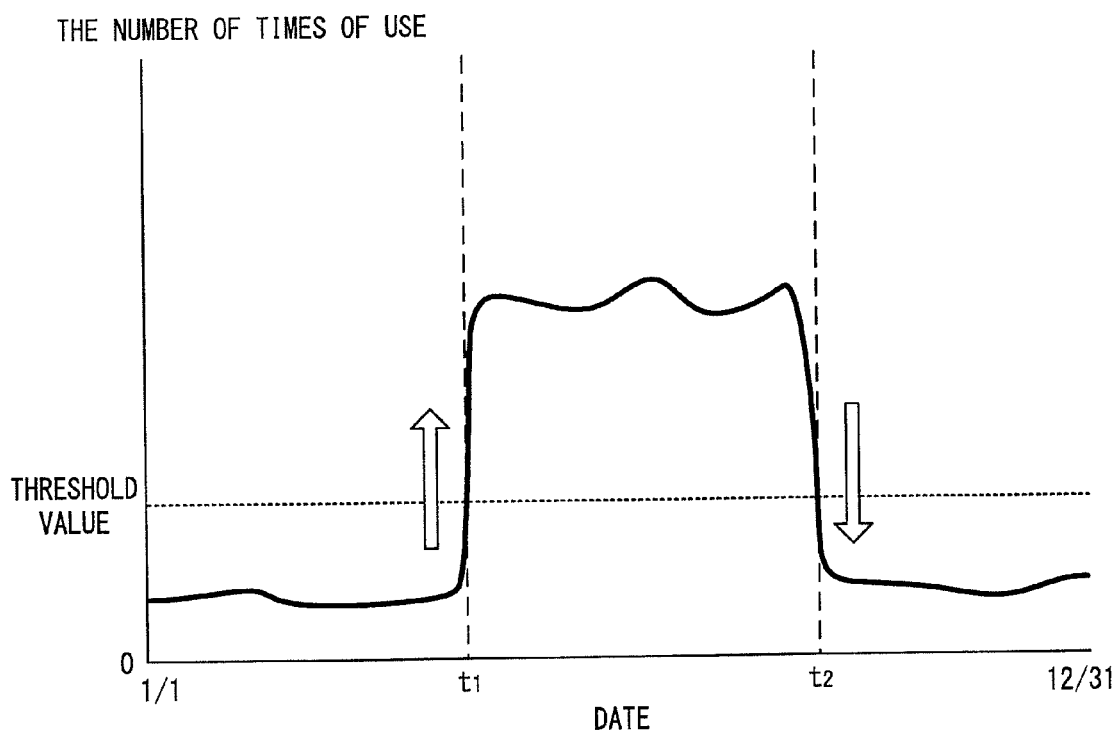
FIG. 10B is a graph showing an example of a transition of the number of times of use of a keyword, whose number of times of use is artificially increased, during one year.

2-4-4. Exclusion of Period in which the Number of Times of Use is Artificially Increased When the number of times of use is artificially increased, the number of times of use is not increased by popularity. Therefore, a period in which the number of times of use is artificially increased is not the high season. FIG. 10B is a graph showing an example of a transition of the number of times of use of a keyword, whose number of times of use is artificially increased, during one year.

As an example in which the number of times of use is artificially increased, there is content of Web page and the like which is publicly available for a limited time only. As such content, for example, there is a Web page featuring something. In this Web page, a link to the online shopping mall is provided. A keyword is associated with the link. When a user selects the link, the user terminal 4 requests the online shopping mall server 1 to search for an item for sale by using the keyword associated with the link as a search condition. Therefore, when such a Web page is published, the number of times of use of a specific keyword increases, and when the Web page is closed, the number of times of use of the specific keyword returns to the original state. In other words, as shown in FIG. 10B, when the period of a candidate for the high season begins and when it ends, the change rate of the number of times of use is great.

As another example in which the number of times of use is artificially increased, there is a crawler. The crawler is a program or an information processing apparatus which continuously and repeatedly sends a search request to the online shopping mall server 1 and collects information such as search results. Therefore, when a crawler starts processing, the number of times of use of a specific keyword increases, and when a crawler ends the processing, the number of times of use of the specific keyword returns to the original state. Therefore, the transition of the number of times of use is as shown in FIG. 10B.

Therefore, conditions of each of the change rates of the number of times of use at the beginning and ending of the period of a candidate for the high season are determined. The following formulas 5 and 6 represent the condition of the change rate at the beginning of the period. The following formulas 7 and 8 represent the condition of the change rate at the ending of the period.

$$\frac{SV(t_1, k)}{H(k)} > CCS1 \quad \text{[Mathematical Formula 5]}$$

$$\frac{\text{Max}(SV(t_1, k), SV(t_1+1, k), SV(t_1+2, k))}{\text{Min}(SV(t_1-1, k), SV(t_1-2, k), SV(t_1-3, k))} > CCS2 \quad \text{[Mathematical Formula 6]}$$

$$\frac{SV(t_2, k)}{H(k)} > CCE1 \quad \text{[Mathematical Formula 7]}$$

$$\frac{\text{Max}(SV(t_2, k), SV(t_2-1, k), SV(t_2-2, k))}{\text{Min}(SV(t_2+1, k), SV(t_2+2, k), SV(t_2+3, k))} > CCE2 \quad \text{[Mathematical Formula 8]}$$

CCS1, CCS2, CCE1, and CCE2 are predetermined upper limits of the change rate. The administrator can arbitrarily determine each upper limit. The four upper limits may be the same value. From the relationship with the formulas 3 and 4, CCS1 satisfies CCS1<CES1 and CCS2 satisfies CCS2<CES1. CES1, CES2, CCS1, CCS2, CCE1, and CCE2 are an example of a second rate of the present invention.

When a period of a candidate for the high season satisfies at least either one of the formula 5 and the formula 6 and satisfies at least either one of the formula 7 and the formula 8, the online shopping mall server 1 excludes the period from the high season. The online shopping mall server 1 may use only the formulas 6 and 8.

2-4-5. Others

When a period in which use of a keyword is popular appears in a one year cycle, the period is the high season. Therefore, if a candidate for the high season is identified in a certain year but the candidate for the high season is not identified in another year, there is a probability that the identified candidate is not the high season. Further, if a period of a candidate for the high season in a certain year is completely different from a period of the candidate for the high season in another year, there is a probability that the identified candidates are not the high seasons. Therefore, the online shopping mall server 1 may compare transitions of the number of times of use of the same keyword in a plurality of years. When the transitions of the number of times of use are not similar to each other, the online shopping mall server 1 may exclude the candidate for the high season from the high season. Specifically, the online shopping mall server 1 calculates the degree of similarity. For example, the online shopping mall server 1 calculates a difference of the numbers of times of use for each same day. The online shopping mall server 1 calculates the degree of similarity by integrating the differences of each day. At this time, the smaller the differences, the higher the degree of similarity is. When the degree of similarity is smaller than a predetermined value SIM1, the online shopping mall server 1 excludes the candidate for the high season from the high season.

3. Application of Identification Result of High Season

Next, application examples of identification results of high season will be described with reference to FIGS. 11 and 12.

3-1. Grouping of Keywords

The online shopping mall server 1 divides a plurality of keywords which have a high season into groups of keywords whose periods of high season are similar to each other. This is because there is a probability that a plurality of keywords whose periods of high season are similar to each other become popular by the same factor. In other words, there is a probability that the plurality of keywords are related to each other. However, if the online shopping mall server 1 identifies a high season for each keyword by the process of steps S1 to S3, it takes a long processing time. Further, the processing load of the online shopping mall server 1 increases. Therefore, the online shopping mall server 1 identifies a high season for a part of the keywords by the process of steps S1 to S3. Then, the online shopping mall server 1 compares a transition of the number of times of use of a keyword whose high season is identified during one year and transitions of the number of times of use of the other keywords during one year. Then, the online shopping mall server 1 divides the keywords into groups on the basis of the comparison result.

For example, the online shopping mall server 1 puts keywords, whose transition of the number of times of use is similar to the transition of the keyword whose high season is identified, into the same group as that of the keyword whose high season is identified. Specifically, the online shopping mall server 1 calculates the degree of similarity. At this time, even when the numbers of times of use of both keywords are different from each other, if the shapes of the transitions of the numbers of times of use are similar to each other, the online shopping mall server 1 calculates the degree of similarity so that the degree of similarity is high. When the degree of similarity is greater than or equal to a predetermined value SIM2, the online shopping mall server 1 puts the keyword into the same group as that of the keyword whose high season is identified.

Figure 11:
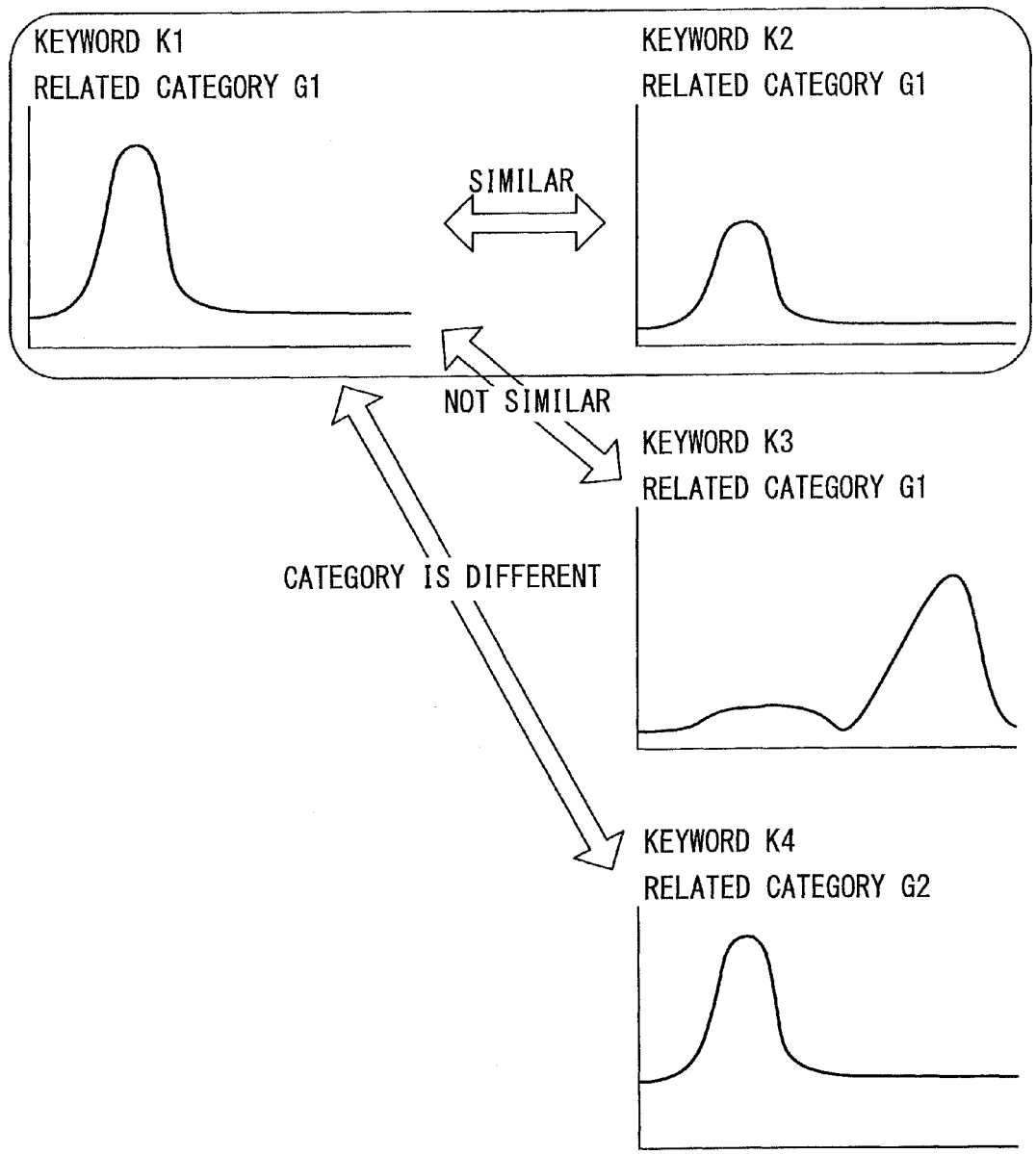
FIG. 11 is a diagram showing an example of grouping of keywords.

FIG. 11 is a diagram showing an example of grouping of the keywords. As shown in FIG. 11, the high season of the keyword K1 has been identified. On the other hand, the high seasons of the keywords K2 to K4 have not been identified. Here, the transition of the number of times of use of the keyword K2 is similar to the transition of the number of times of use of the keyword K1, so that the keyword K2 is put into the same group as that of the keyword K1. On the other hand, the transition of the number of times of use of the keyword K3 is not similar to the transition of the number of times of use of the keyword K1, so that the keyword K3 cannot be put into the same group as that of the keyword K1.

The online shopping mall server 1 may use the category of item for sale as the condition of the grouping. Specifically, the online shopping mall server 1 identifies a category related to each keyword. This is because there is a probability that the category related to a keyword represents a thing that affects the number of times of use of the keyword. The administrator can arbitrarily determine how to extract keyword and a category related to each other. For example, the administrator may extract them manually or the online shopping mall server 1 may extract them automatically. The online shopping mall server 1 can use a known method as an extraction method. When a category related to a keyword whose high season is identified is different from a category related to a certain keyword, the online shopping mall server 1 does not put the certain keyword into the same group as that of the keyword whose high season is identified. The reason of this is because there is a probability that things that affect the transitions of the number of times of use are different from each other. As shown in FIG. 11, the keywords K1 to K3 are related to the category G1. On the other hand, the keyword K4 is related to the category G2. Therefore, even if the transition of the number of times of use of the keyword K4 is similar to the transition of the number of times of use of the keyword K1, the keyword K4 cannot be put into the same group as that of the keyword K1.

The administrator can create a Web page that features a certain category. In this Web page, grouped keywords are displayed as keywords related to the featured category. When a user selects a keyword, the online shopping mall server 1 searches for an item for sale by using the selected keyword as a search condition. The administrator may determine an open period of the Web page on the basis of the period of the high season of the keyword related to the featured category.

3-2. Priority of Proposal of Keyword

Figure 12A:
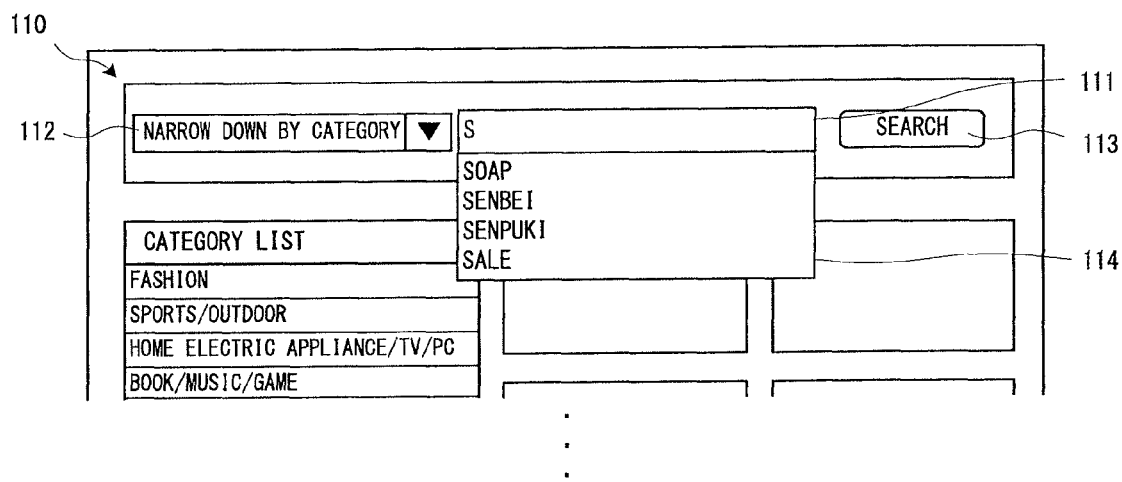
FIGS. 12A and 12B are diagrams showing display examples of a top page of an online shopping mall.
Figure 12B:
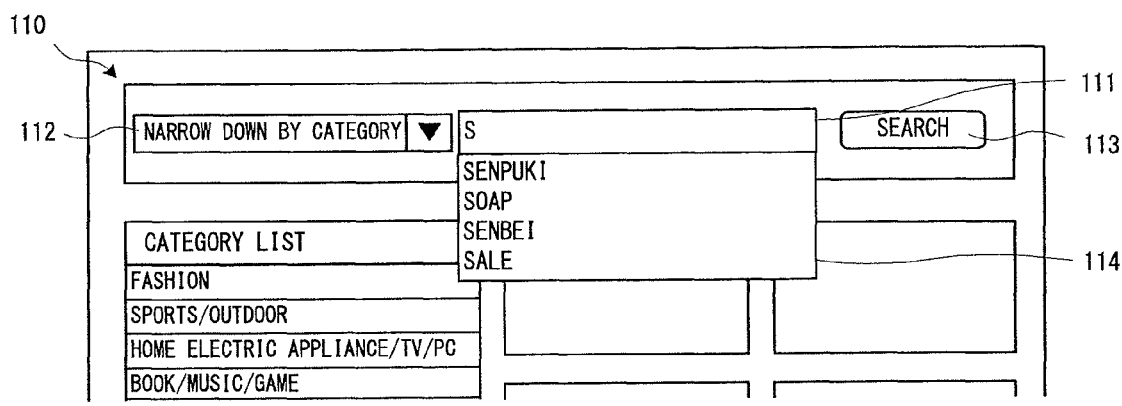

When a user inputs a keyword as a search condition in the online shopping mall, the user can use a keyword suggestion function. The keyword suggestion function is a function to display candidate of keywords (keyword candidates) and make a candidate for keyword be able to be designated as a search condition. FIGS. 12A and 12B are diagrams showing display examples of a top page of the online shopping mall. As shown in FIG. 12A, the top page includes a search condition setting area 110 and the like. The search condition setting area 110 includes a keyword input field 111, a category selection menu 112, a search button 113, and the like. The keyword input field 111 is an input area for inputting a keyword. The category selection menu 112 is a pull-down menu for selecting a category to be designated as a search condition. The search button 113 is a button for designating the keyword inputted in the keyword input field 111 and the category selected in the category selection menu 112 as search conditions.

When the user starts inputting keyword in the keyword input field 111, a search keyword candidate display area 114 is displayed immediately below the keyword input field 111. Keyword candidates are displayed as a list in the search keyword candidate display area 114. Each of keywords displayed as candidates is a keyword of which a forward part or the whole corresponds to a character string composed of at least one character inputted in the keyword input field 111. When one or more alphabetical character are inputted in the keyword input field 111, each of the keywords displayed as candidates is a keyword of which a forward part or the whole corresponds to the inputted alphabetical character. For example, when "s" is inputted, keywords such as "soap", "senbei", "senpuki", and "sale" are displayed in the search keyword candidate display area 114. "senbei" is a Japanese word which represents a Japanese rice cracker. "senpuki" is a Japanese word which represents an electric fan. For example, a condition to determine the display priority of the keywords in the keyword input field 111 is determined in advance. For example, the greater a total number of times of use of a keyword in a predetermined period, the higher the priority of the keyword may be. When the user selects any one of the keywords displayed in the keyword input field 111, the online shopping mall server 1 searches for an item for sale by using the selected keyword as a search condition.

The online shopping mall server 1 may control the display priority in the keyword input field 111 on the basis of a relationship between the current date and positions of the high season of each keyword. For example, the online shopping mall server 1 may raise the priority of a keyword whose high season includes today.

For example, it is assumed that "soap", "senbei", and "sale" have no high season. On the other hand, it is assumed that the high season of "senpuki" is from June 15 to September 10. For example, if today is March 1, as shown in FIG. 12A, the priority of "senpuki" is the third. On the other hand, if today is July 1, as shown in FIG. 12B, the priority of "senpuki" is raised to the highest level. For example, the online shopping mall server 1 may directly raise the priority. Or, the online shopping mall server 1 may raise the priority as a result of correcting, for example, an index value for determining the priority (for example, the total number of times of use).

The online shopping mall server 1 may raise the priority of a keyword from a date a predetermined number of days before the start day of the high season. The online shopping mall server 1 may end the raising of the priority of a keyword from a date a predetermined number of days before the end day of the high season. For example, the predetermined number of days is assumed to be 10 days. In this case, the priority of "senpuki" is raised from June 5 to August 31.

3-3. Demand Forecasting

The identification result of the high season can be used to forecast demand of an item for sale. The reason of this is because we consider that the greater the number of times of use of a keyword, the greater the number of sales of an item for sale related to the keyword. The number of sales of an item for sale tends to change with being somewhat delayed from the number of times of use of the keyword. The reason of this is because a user purchases a searched item for sale after the user considers the searched item to some extent of time after searching. A keyword related to an item for sale may be, for example, a keyword included in the item name or an explanation of the item for sale. The reason of this is because the online shopping mall server 1 searches for an item for sale whose name or explanation includes a keyword designated as a search condition.

For example, there is a probability that the high season of a keyword related to an item for sale is a period in which the number of sales of the item for sale is the greatest. Or, the period in which the number of sales of the item for sale is the greatest appears somewhat later than the high season. Therefore, basically, a shop may prepare a stock of the item for sale according to the high season of the keyword.

When the number of sales of the item for sale is divided by the number of times of use of the keyword, a conversion ratio from search to purchase is obtained. If the conversion ratio is low even in the high season, there is a probability that there is some reason for the low conversion ratio. Therefore, when the conversion ratio is low, the shop can investigate the cause of the low conversion ratio. For example, the cause may be a shortage of stock of the item for sale.

For example, when an item for sale is designated by a shop, the online shopping mall server 1 identifies a keyword related to the designated item for sale. Then, the online shopping mall server 1 causes the shop terminal 3 to display, for example, the presence or absence of high season of the identified keyword and a period of the high season. Further, the online shopping mall server 1 may cause the shop terminal 3 to display a table, a graph, and the like that represent the transition of the number of times of use of the identified keyword, the number of sales of the designated item for sale, and the transition of the conversion ratio and a stock quantity.

4. Configuration of Online Shopping Mall Server

Next, a configuration of the online shopping mall server 1 will be described with reference to FIGS. 13 and 14.

Figure 13:
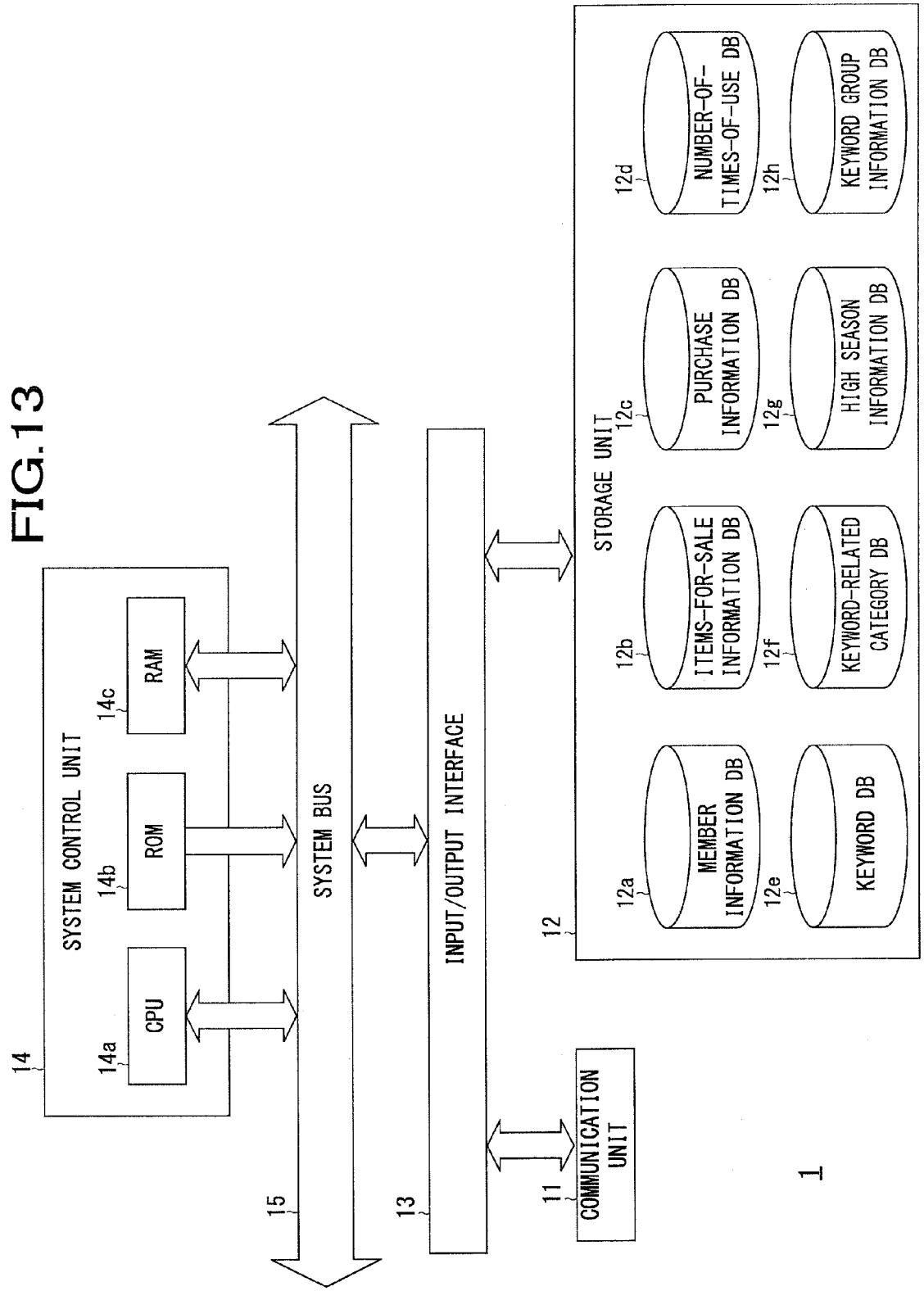
FIG. 13 is a block diagram showing an example of a schematic configuration of an online shopping mall server 1 according to the embodiment.

FIG. 13 is a block diagram showing an example of a schematic configuration of the online shopping mall server 1 according to the embodiment. As shown in FIG. 13, the online shopping mall server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminals 4 and the like.

The storage unit 12 includes, for example, a hard disk drive and the like. In the storage unit 12, databases such as a member information DB 12a, an items-for-sale information DB 12b, a purchase information DB 12c, a number-of-times-of-use DB 12d, a keyword DB 12e, a keyword-related category DB 12f, a high season information DB 12g, and a keyword group information DB 12h are constructed.

FIG. 14A is a diagram showing an example of content registered in the member information DB 12a. In the member information DB 12a, member information related to users registered in the information processing system S as a member is registered. Specifically, in the member information DB 12a, user attributes which are a user ID, a password, a nickname, a name, a date of birth, a gender, a postal code, an address, a phone number, an email address, and the like are registered in association with each other for each user. The user ID is identification information of the user.

FIG. 14B is a diagram showing an example of content registered in the items-for-sale information DB 12b. In the items-for-sale information DB 12b, items-for-sale information related to the items for sale sold in the online shopping mall is registered. Specifically, in the items-for-sale information DB 12b, attributes of items for sale which are an item ID, a shop ID, a product code, a category ID, an item name, a URL (Uniform Resource Locator) of item image, an item description, an item price, a stock quantity and the like are registered in association with each other for each item for sale sold by each shop. The item ID is identification information of item for sale for a shop or the like to manage the item for sale sold by the shop. The shop ID indicates a shop which sells the item for sale. The product code is a code number to identify the item for sale. Examples of the product code include, for example, JAN (Japanese Article Number) and the like. The category ID is identification information of a category to which the item for sale belongs.

FIG. 14C is a diagram showing an example of content registered in the purchase information DB 12c. In the purchase information DB 12c, purchase information related to purchase of item for sale is registered. Specifically, in the purchase information DB 12c, an item ID, a shop ID, a product code, a category ID, a date, the number of sales, and a stock quantity are registered in association with each other for each item for sale and date. The item ID, the shop ID, the product code, and the category ID are information of an item for sale whose number of sales and stock quantity are shown. The number of sales and the stock quantity are the number of sales and the stock quantity on the day indicated by the date.

FIG. 14D is a diagram showing an example of content registered in number-of-times-of-use DB 12d. In number-of-times-of-use DB 12d, the transition of the number of times of use of each keyword is registered. Specifically, in number-of-times-of-use DB 12d, a keyword, a date, and the number of times of use are registered in association with each other for each keyword and date. For example, every time the system control unit 14 receives a search request from the user terminal 4, the system control unit 14 may add 1 to the number of times of use corresponding to a keyword designated as a search condition and today's date. For example, the system control unit 14 may store a log of the search request from the user terminal 4 in the storage unit 12 and periodically count the number of times of use based on the log.

FIG. 14E is a diagram showing an example of content registered in the keyword DB 12e. In the keyword DB 12e, a plurality of keywords that are candidates to be displayed in the keyword suggestion function are registered. For example, among keywords which users designated as search conditions during a predetermined period, keywords whose number of times of designation is greater than or equal to a predetermined number of times are registered in the keyword DB 12e.

FIG. 14F is a diagram showing an example of content registered in the keyword-related category DB 12f. In the keyword-related category DB 12f, a pair of a keyword and a category ID of a category which are related to each other is registered.

FIG. 14G is a diagram showing an example of content registered in the high season information DB 12g. In the high season information DB 12g, high season information related to a keyword whose high season is identified is registered. Specifically, in the high season information DB 12g, the keyword and a period of the high season are registered in association with each other.

FIG. 14H is a diagram showing an example of content registered in the keyword group information DB 12h. In the keyword group information DB 12h, keyword group information related to a group of keywords is registered. Specifically, in the keyword group information DB 12h, a group ID, a category ID, a period of high season, and a plurality of keywords are registered in association with each other. The group ID is identification information of the group. The category ID indicates a category related to the group. The period of high season indicates a high season of the group. Each keyword is a keyword related to a category indicated by the category ID. A period of high season of each keyword is the period of high season registered in association with the keywords.

Next, other information stored in the storage unit 12 will be described. The storage unit 12 stores various data such as HTML (HyperText Markup Language) documents for displaying Web pages, XML (Extensible Markup Language) documents, image data, text data, and electronic documents. Further, the storage unit 12 stores various setting values set by an administrator or the like. Examples of the setting values include a, 0, and ND.

Further, the storage unit 12 stores various programs which area operating system, a WWW (World Wide Web) server program, a DBMS (Database Management System), an electronic commerce management program, and the like. The electronic commerce management program is a program for performing processes related to the online shopping mall, such as identifying a high season of a keyword, searching for an item for sale, and ordering an item for sale. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as a threshold value determination means, a candidate identification means, an exclusion means, a period determination means, a grouping means, and a priority control means of the present invention.

The online shopping mall server 1 may include a plurality of server devices. For example, a server device that identifies a high season of a keyword, a server device that performs processing, such as searching for an item for sale and ordering an item for sale, a server device that transmits a Web page according to a request from the user terminal 4, a server device that manages databases, and the like may be connected to each other by a LAN or the like.

5. Operation of Information Processing System

Next, an operation of the information processing system S will be described with reference to FIGS. 15 to 18.

Figure 15:
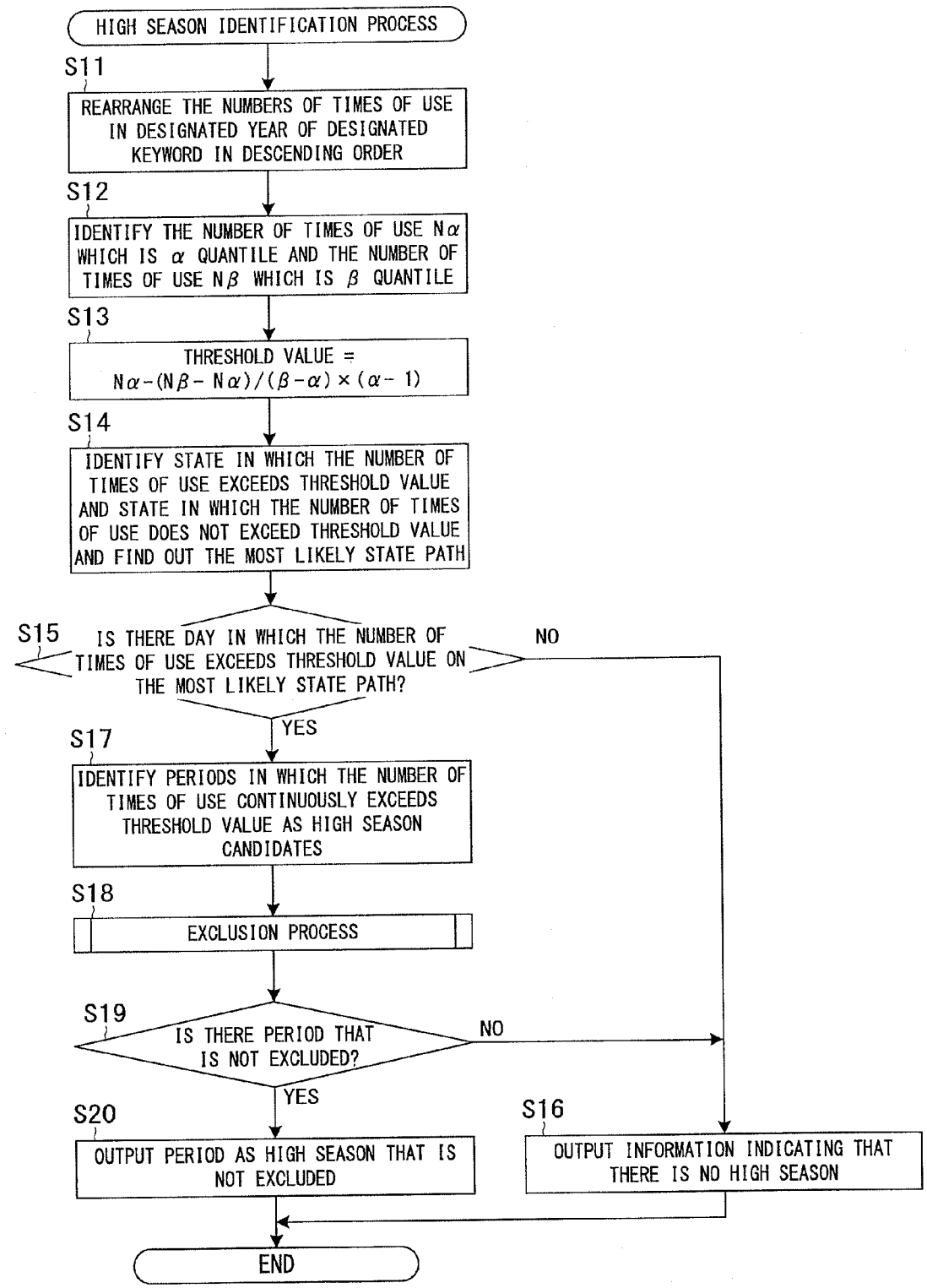
FIG. 15 is a flowchart showing a process example of a high season identification process of a system control unit 14 of the online shopping mall server 1 according to the embodiment.

FIG. 15 is a flowchart showing a process example of a high season identification process of the system control unit 14 of the online shopping mall server 1 according to the embodiment. The high season identification process is a process for identifying a high season of a designated keyword. For example, when an administrator designates a keyword and a year by operating the management terminal 2, the high season identification process may be performed. Further, for example, while the online shopping mall server 1 performs a process related to a keyword, when the online shopping mall server 1 needs to identify the high season of the keyword that is being processed, the high season identification process may be performed.

In FIG. 15, steps S11 to S13 represent a specific process of step S1 shown in FIG. 2. Steps S14, S15, and S17 represent a specific process of step S2. Step S18 represents step S3. The specific process of step S18 will be shown in FIG. 16 described later.

The system control unit 14 acquires the number of times of use in each day in the designated year of the designated keyword from number-of-times-of-use DB 12d. If the year is not designated, the numbers of times of use of the last year are acquired. Next, the system control unit 14 rearranges the acquired numbers of times of use in descending order (step S11). Next, the system control unit 14 identifies the number of times of use Na which is the α quantile and the number of times of use Nβ which is the β quantile from the arrangement of the numbers of times of use (step S12). Next, the system control unit 14 determines the threshold value by calculating a linear function that is calculated when substituting 1 for the variable x of the linear function formula (step S13). Specifically, the system control unit 14 calculates the following formula.

$$\text{Threshold value}=N\alpha-(N\beta-N\alpha)/((\beta-\alpha)\times(\alpha-1))$$

Next, for each day in one year, the system control unit 14 identifies either one of a state in which the number of times of use exceeds the threshold value and a state in which the number of times of use does not exceed the threshold value on the basis of the actual number of times of use. Then, the system control unit 14 finds out the most likely state path by using the dynamic programming (step S14). Next, the system control unit 14 determines whether or not there is a day in which the number of times of use exceeds the threshold value on the most likely state path (step S15). At this time, if the system control unit 14 determines that there is no day in which the number of times of use exceeds the threshold value (step S15: NO), the system control unit 14 proceeds to step S16. In step S16, the system control unit 14 outputs information indicating that there is no high season as a processing result. After completing this process, the system control unit 14 ends the high season identification process.

On the other hand, if the system control unit 14 determines that there is a day in which the number of times of use exceeds the threshold value (step S15: YES), the system control unit 14 proceeds to step S17. In step S17, the system control unit 14 identifies one or more periods in which the number of times of use continuously exceeds the threshold value as candidates for the high season.

Figure 16:
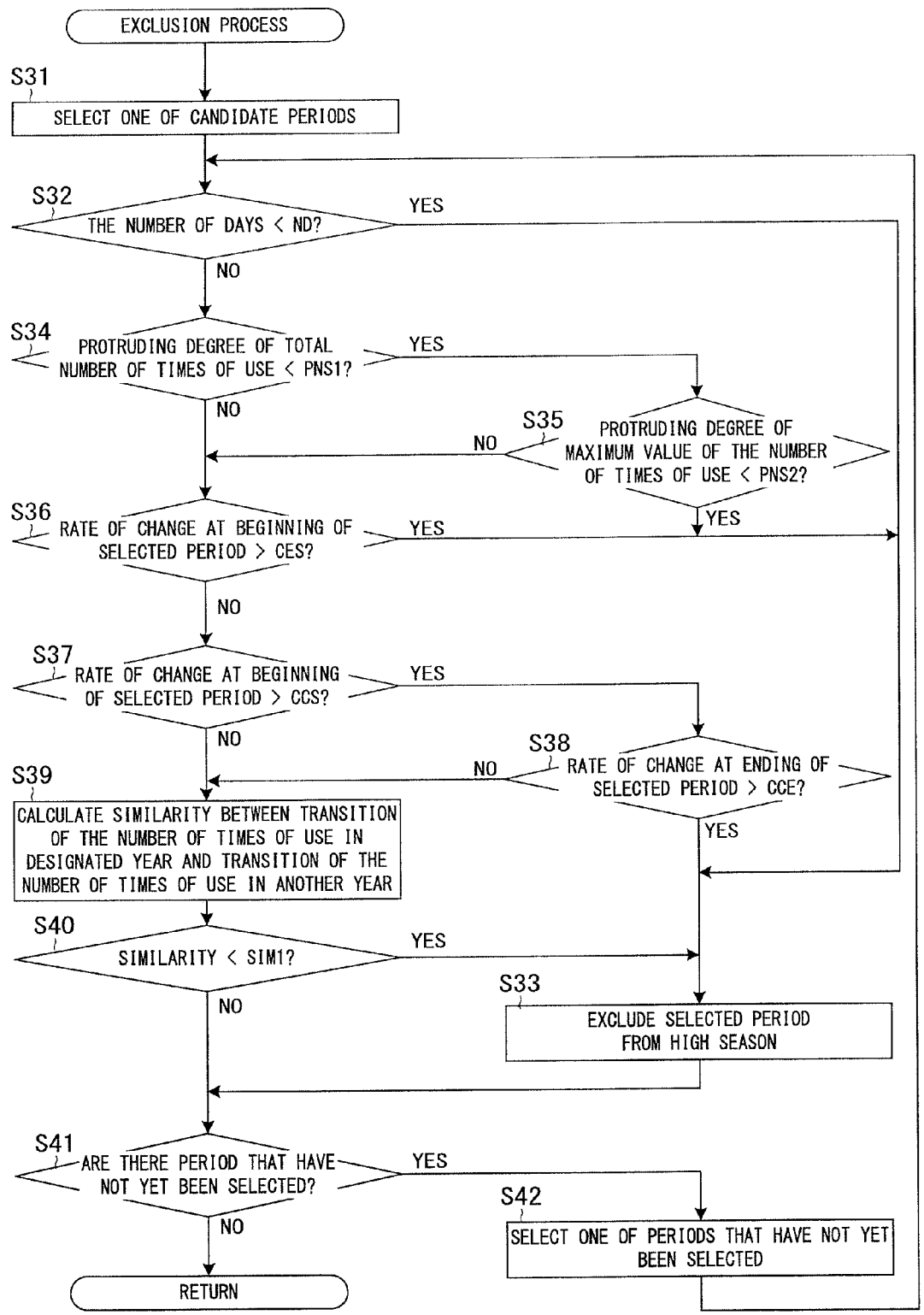
FIG. 16 is a flowchart showing a process example of an exclusion process of the system control unit 14 of the online shopping mall server 1 according to the embodiment.

Next, the system control unit 14 performs an exclusion process (step S18). FIG. 16 is a flowchart showing a process example of the exclusion process of the system control unit 14 of the online shopping mall server 1 according to the embodiment.

As shown in FIG. 16, the system control unit 14 selects one out of one or more candidate periods that have been identified (step S31). Next, the system control unit 14 determines whether or not the number of days in the selected period is smaller than ND (step S32). At this time, if the system control unit 14 determines that the number of days in the selected period is smaller than ND (step S32: YES), the system control unit 14 proceeds to step S33. On the other hand, if the system control unit 14 determines that the number of days in the selected period is greater than or equal to ND (step S32: NO), the system control unit 14 proceeds to step S34.

In step S33, the system control unit 14 excludes the selected period from the high season. Next, the system control unit 14 proceeds to step S41.

In step S34, the system control unit 14 determines whether or not the protrusion degree of the total number of times of use of the keyword in the selected period is smaller than PNS1 on the basis of the formula 1. At this time, if the system control unit 14 determines that the protrusion degree is smaller than PNS1 (step S34: YES), the system control unit 14 proceeds to step S35. On the other hand, if the system control unit 14 determines that the protrusion degree is greater than or equal to PNS1 (step S34: NO), the system control unit 14 proceeds to step S36.

In step S35, the system control unit 14 determines whether or not the protrusion degree of the maximum value of the number of times of use of the keyword in the selected period is smaller than PNS2 on the basis of the formula 2. At this time, if the system control unit 14 determines that the protrusion degree is smaller than PNS2 (step S35: YES), the system control unit 14 excludes the selected period from the high season (step S33). On the other hand, if the system control unit 14 determines that the protrusion degree is greater than or equal to PNS2 (step S35: NO), the system control unit 14 proceeds to step S36.

In step S36, the system control unit 14 determines whether or not the change rate of the number of times of use at the beginning of the selected period is greater than CES (CES1 and CES2) on the basis of the formulas 3 and 4. At this time, if the system control unit 14 determines that the change rate is greater than CES (step S36: YES), the system control unit 14 excludes the selected period from the high season (step S33). On the other hand, if the system control unit 14 determines that the change rate is smaller than or equal to CES (step S36: NO), the system control unit 14 proceeds to step S37.

In step S37, the system control unit 14 determines whether or not the change rate of the number of times of use at the beginning of the selected period is greater than CCS (CCS1 and CCS2) on the basis of the formulas 5 and 6. At this time, if the system control unit 14 determines that the change rate is greater than CCS (step S37: YES), the system control unit 14 proceeds to step S38. On the other hand, if the system control unit 14 determines that the change rate is smaller than or equal to CCS (step S37: NO), the system control unit 14 proceeds to step S39.

In step S38, the system control unit 14 determines whether or not the change rate of the number of times of use at the ending of the selected period is greater than CCE (CCE1 and CCE2) on the basis of the formulas 7 and 8. At this time, if the system control unit 14 determines that the change rate is greater than CCE (step S38: YES), the system control unit 14 excludes the selected period from the high season (step S33). On the other hand, if the system control unit 14 determines that the change rate is smaller than or equal to CCE (step S38: NO), the system control unit 14 proceeds to step S39.

In step S39, the system control unit 14 calculates the similarity between the transition of the number of times of use in the designated year of the designated keyword and the transition of the number of times of use in another year of the designated keyword. Next, the system control unit 14 determines whether or not the similarity is smaller than SIM1 (step S40). At this time, if the system control unit 14 determines that the similarity is smaller than SIM1 (step S40: YES), the system control unit 14 excludes the selected period from the high season (step S33). On the other hand, if the system control unit 14 determines that the similarity is greater than or equal to SIM1 (step S40: NO), the system control unit 14 proceeds to step S41.

In step S41, the system control unit 14 determines whether or not there is at least one period that has not yet been selected among one or more candidate periods that have been identified. At this time, if the system control unit 14 determines that there is at least one period that has not yet been selected (step S41: YES), the system control unit 14 selects one out of one or more periods that have not yet been selected (step S42). Next, the system control unit 14 proceeds to step S32. On the other hand, if the system control unit 14 determines that the system control unit 14 has selected all the periods (step S41: NO), the system control unit 14 ends the exclusion process.

As shown in FIG. 15, the system control unit 14, which has completed the exclusion process, determines whether or not there is a period that is not excluded from the high season among the periods which are identified as candidates for the high season (step S19). At this time, if the system control unit 14 determines that all the periods are excluded (step S19: NO), the system control unit 14 proceeds to step S16. On the other hand, if the system control unit 14 determines that there is a period that is not excluded (step S19: YES), the system control unit 14 proceeds to step S20. In step S20, the system control unit 14 determines the period that is not excluded to be the high season. Then, the system control unit 14 outputs the designated keyword and the start day and the end day of the high season as a processing result. At this time, the system control unit 14 registers the designated keyword and the start day and the end day of the high season in the high season information DB 12g in association with each other. After completing this process, the system control unit 14 ends the high season identification process.

Figure 17:
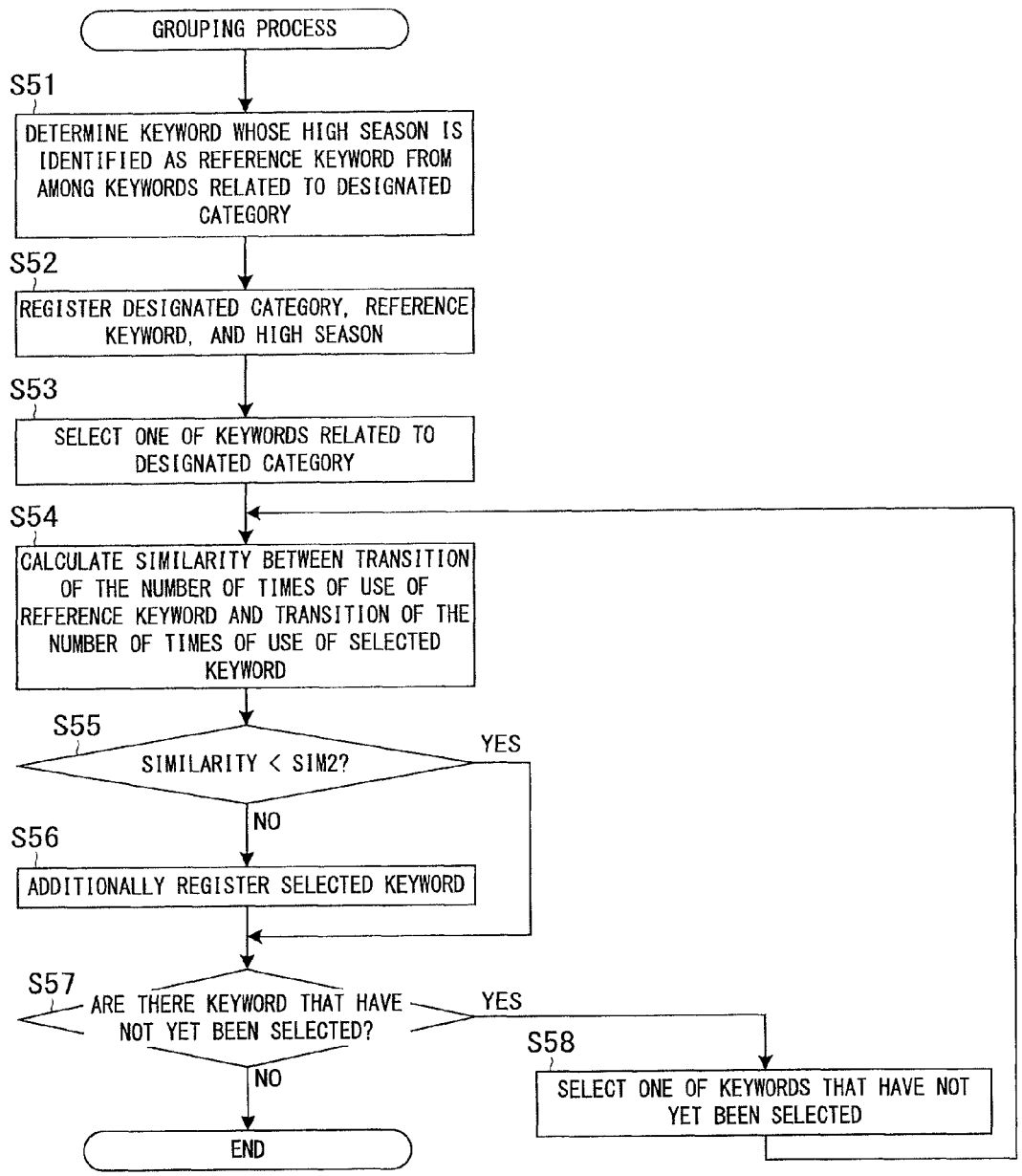
FIG. 17 is a flowchart showing a process example of a grouping process of the system control unit 14 of the online shopping mall server 1 according to the embodiment.

FIG. 17 is a flowchart showing a process example of a grouping process of the system control unit 14 of the online shopping mall server 1 according to the embodiment. The grouping process is a process to integrate keywords related to each other into one group. For example, when an administrator designates a category by operating the management terminal 2, the grouping process is performed.

As shown in FIG. 17, the system control unit 14 acquires a plurality of keywords related to the designated category on the basis of the keyword-related category DB 12f. Then, the system control unit 14 determines a keyword whose high season is identified as a reference keyword among the acquired keywords (step S51). At this time, the system control unit 14 may search for a keyword whose high season is identified from the high season information DB 12g. Or, the system control unit 14 may perform the high season identification process (FIG. 15) for each keyword related to the designated category until a keyword having a high season is found.

Next, the system control unit 14 generates a new group ID. Then, the system control unit 14 registers the generated group ID, the category ID of the designated category, the reference keyword, and the period of the high season identified for the reference keyword in the keyword group information DB 12h in association with each other (step S52).

Next, the system control unit 14 selects one of the keywords related to the designated category except for the reference keyword (step S53). Next, the system control unit 14 calculates the similarity between the transition of the number of times of use of the reference keyword in the last year and the transition of the number of times of use of the selected keyword in the last year (step S54). Next, the system control unit 14 determines whether or not the similarity is smaller than SIM2 (step S55). At this time, if the system control unit 14 determines that the similarity is smaller than SIM2 (step S55: YES), the system control unit 14 proceeds to step S57. On the other hand, if the system control unit 14 determines that the similarity is greater than or equal to SIM2 (step S55: NO), the system control unit 14 proceeds to step S56. In step S56, the system control unit 14 additionally registers the selected keyword in the keyword group information DB 12h in association with the group ID generated in step S52.

Next, the system control unit 14 determines whether or not there is at least one keyword that has not yet been selected among the keywords related to the designated category (step S57). At this time, if the system control unit 14 determines that there is at least one keyword that has not yet been selected (step S57: YES), the system control unit 14 proceeds to step S58. In step S58, the system control unit 14 selects one of the keywords that have not yet been selected. Next, the system control unit 14 proceeds to step S54. On the other hand, if the system control unit 14 determines that the system control unit 14 has selected all the keywords (step S57: NO), the system control unit 14 ends the grouping process. At this time, the system control unit 14 outputs the category ID of the designated category, the grouped keywords, and the period of the high season.

Figure 18:
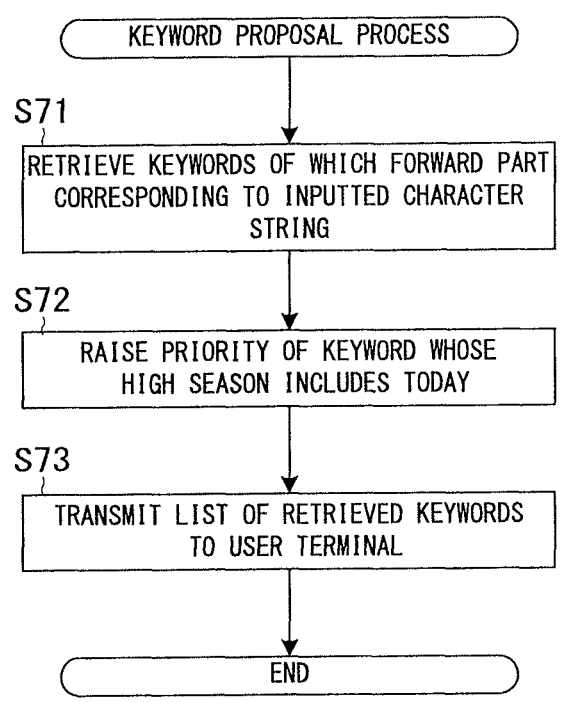
FIG. 18 is a flowchart showing a process example of a keyword proposal process of the system control unit 14 of the online shopping mall server 1 according to the embodiment.

FIG. 18 is a flowchart showing a process example of a keyword proposal process of the system control unit 14 of the online shopping mall server 1 according to the embodiment. The keyword proposal process is a process to provide the keyword suggestion function to the user terminal 4. Every time a user performs an input operation to the keyword input field 111 displayed by the user terminal 4, the user terminal 4 transmits a search keyword candidate request to the online shopping mall server 1. A character string inputted in the keyword input field 111 at the point of time when the user terminal 4 transmits the search keyword candidate request is stored in the search keyword candidate request. The keyword proposal process is started when the online shopping mall server 1 receives the search keyword candidate request.

As shown in FIG. 18, the system control unit 14 retrieves each keyword of which a forward part or the whole corresponds to the character string included in the search keyword candidate request from the keyword DB 12e (step S71). Then, the system control unit 14 determines the priorities of the retrieved keywords on the basis of a predetermined standard. Next, on the basis of the high season information DB 12g, the system control unit 14 identifies a keyword whose high season includes today among the retrieved keywords. Then, the system control unit 14 raises the priority of the keyword whose high season includes today (step S72). Next, the system control unit 14 transmits a list, in which the retrieved keywords are arranged in the same order as the priority, as a keyword list to the user terminal 4 that has transmitted the search keyword candidate request (step S73). After completing this process, the system control unit 14 ends the keyword proposal process.

The user terminal 4 that receives the keyword list displays the search keyword candidate display area 114. Further, the user terminal 4 displays the keywords registered in the list in the search keyword candidate display area 114 in the same order as the priority. Thereby, for example, the keyword candidates are displayed as shown in FIG. 12A or 12B.

As described above, according to the embodiment, the system control unit 14 determines the threshold value of the number of times of use on the basis of the number of times of use of a keyword for each day included in a period of one year and identifies periods in which the number of times of use exceeds the threshold value in a period of one year as candidates for the high season. When a situation in which the numbers of times of use exceed the threshold value in the identified period is different from a situation based on a periodic popularity of a keyword, the system control unit 14 excludes the identified period from the high season. When the identified period is not excluded from the high season, the system control unit 14 determines the identified period to be the high season. Therefore, it is possible to identify a period in which use of a keyword is popular from among periods that appear in a one year cycle.

Further, the system control unit 14 determines the threshold value on the basis of the number of times of use to which an ordinal number is assigned. The ordinal number corresponds to a predetermined ratio that is greater than an upper limit ratio of the high season to the one year. The ordinal number indicates a sequential position of the number of times of use in a plurality of numbers of times of use in days included in one year when the plurality of numbers of times of use is arranged in descending order. Therefore, it is possible to determine the threshold value according to a distribution of the numbers of times of use where a keyword is considered to be not popular.

Further, the system control unit 14 determines a linear function to be the threshold value. the linear function is calculated when substituting the ordinal number corresponding to a ratio smaller than or equal to the upper limit of the high season into a formula. The formula is determined so that two linear function is separately calculated when two of the ordinal numbers corresponding to respective $\alpha$ and $\beta$ are separately substituted into the formula. Each of the two linear functions is equal to the number of times of use to which the substituted ordinal number is assigned. Therefore, it is possible to accurately determine the threshold value.

Further, on the basis of an actual numbers of times of use and the threshold value, the system control unit 14 identifies a likely period as the period in which the number of times of use exceeds the threshold value. Therefore, it is possible to identify an appropriate period as a candidate for the high season.

Further, when the protrusion degree which is the protrusion degree of the number of times of use in an identified candidate period is smaller than PNS, the system control unit 14 excludes the candidate period from the high season. The protrusion degree is calculated based on the number of times of use in at least one day included in the candidate period and the threshold value. Therefore, it is possible to exclude a period in which the number of times of use is not protruding enough to consider that the keyword is popular from the high season.

Further, the system control unit 14 determines whether or not the change rate of the number of times of use at the beginning of a candidate period is greater than CES, and if the change rate is greater than CES, the system control unit 14 excludes the candidate period from the high season. Therefore, it is possible to exclude a period from the high season when the number of times of use in the period rapidly increases because the number of times of use is affected by an unexpected event.

Further, the system control unit 14 determines whether or not the change rate of the number of times of use at the beginning of a candidate period is greater than CCS and whether or not the change rate of the number of times of use at the ending of the candidate period is greater than CCE, and if the change rate of the number of times of use at the beginning is greater than CCS and if the change rate of the number of times of use at the ending is greater than CCE, the system control unit 14 excludes the candidate period from the high season. Therefore, it is possible to exclude a period from the high season when the number of times of use in the period rapidly increases and decreases due to artificial increase of the number of times of use.

Further, when a candidate period is shorter than ND, the system control unit 14 excludes the candidate period from the high season. Therefore, it is possible to exclude a period, in which the number of times of use of a keyword temporarily increases regardless of the popularity of the keyword, from the high season.

Further, when the transition of the number of times of use of a reference keyword whose high season is identified is similar to the transition of the number of times of use of a target keyword, the system control unit 14 puts the keyword to be grouped into a keyword group to which the reference keyword belongs. Therefore, when the transition of the number of times of use of the target keyword is similar to the transition of the number of times of use of the reference keyword, it is possible to identify the high season of the target keyword without identifying the high season of the target keyword by the process of steps S1 to S3. Further, it is possible to create a group of keywords related to each other.

Further, when the category to which the reference keyword relates is different from the category to which the target keyword relates, the system control unit 14 does not put the target keyword into the group to which the reference keyword belongs. Therefore, it is possible to create a group of keywords whose categories are the same. The category affects the popularity of the number of times of use.

Further, the system control unit 14 controls the priority of display of a plurality of keywords in the search keyword candidate display area 114. Each of the plurality of keywords includes a character string composed of one or more characters inputted into the keyword input field 111 by a user. The system control unit 14 controls the priority of a keyword whose high season is identified on the basis of a relationship between the present time and the period determined to be the high season. Therefore, it is possible to control the priority of display of candidates of a keyword, which will be used as a search condition, according to the popularity of the keyword.

In the embodiment described above, one year is used as the cycle period. However, one month, one week, one day, a plurality of years, or the like may be used as the cycle period. Further, in the embodiment described above, one day is used as the unit period. However, one month, one week, one hour, or the like may be used as the unit period.

Further, in the embodiment described above, the present invention is applied when an item for sale is searched for as a thing to be searched for. However, the present invention may be applied to, for example, a search for a service, a Web page, an image, a moving image, a sound, a map, news, a blog, and the like.

Further, in the embodiment described above, the present invention is applied to the number of times of use of a keyword which is used as a search condition. However, the present invention may be applied to, for example, the number of times when a keyword is used in information posted on a Web page. Examples of such information include, for example, articles in news and blog. In this case, for example, the number of articles in which the keyword is used may be the number of times of use.

REFERENCE SIGNS LIST

1 Online shopping mall server
2 Management terminal
3 Shop terminal
4 User terminal
11 Communication unit
12 Storage unit
12a Member information DB
12b Items-for-sale information DB
12c Purchase information DB
12d Number-of-times-of-use DB
12e Keyword DB
12f Keyword-related category DB
12g High season information DB
12h Keyword group information DB
13 Input/output interface
14 System control unit
14a CPU
14b ROM
14c RAM
15 System bus
NW Network
S Information processing system

The invention claimed is:

1. An information processing apparatus comprising:
a processor;
a threshold value determination unit that determines a threshold value of a number of times of use of a keyword on the basis of the number of times of use of the keyword in each of unit periods included in a cycle period;
a candidate identification unit that identifies at least one period as a candidate for a popularity period in which the use of the keyword exceeds the threshold value, the candidate being included in the cycle period; and
a period determination unit that,
when any of the at least one period identified by the candidate identification unit does not satisfy a condition that a situation in which the numbers of times of use in the period identified by the candidate identification unit exceeds the threshold value determined by the threshold value determination unit is different from a situation based on a periodic popularity of the keyword, determines the period not satisfying the condition to be the popularity period,
wherein when a protrusion degree of any of the at least one period identified by the candidate identification unit is smaller than a predetermined first rate,
the period determination unit determines the period whose protrusion degree is smaller than the predetermined first rate not to be the popularity period,
the protrusion degree being a degree of protruding of the number of times of use in the identified period and being calculated based on the number of times of use in at least one of the periods included in the identified period and the threshold value determined by the threshold value determination unit.

2. The information processing apparatus according to claim 1, wherein
the threshold value determination unit determines the threshold value on the basis of the number of times of use to which an ordinal number is assigned, the ordinal number indicating a sequential position of the number of times of use in a plurality of numbers of times of use in the unit periods included in the cycle period, the plurality of numbers of times of use being arranged in descending order, the ordinal number corresponding to a predetermined ratio that is greater than an upper limit ratio of the popularity period to the cycle period.

3. The information processing apparatus according to claim 2, wherein
for at least a rate of change of the number of times of use at a beginning of the period identified by the candidate identification unit among the rate of change of the number of times of use at the beginning and a rate of change of the number of times of use at an ending of the period identified by the candidate identification unit, the period determination unit determines whether or not the rate of change is greater than a predetermined second rate, and
the period determination unit determines the period whose rate of change is greater than the predetermined second rate not to be the popularity period.

4. The information processing apparatus according to claim 2, wherein
the threshold value determination unit determines a linear function to be the threshold value, the linear function being calculated by substituting the ordinal number corresponding to a ratio smaller than or equal to the upper limit ratio of the popularity period into a formula of the linear function, and
the formula is determined so that when two of the ordinal numbers corresponding to respective two of the predetermined ratios are separately substituted into the formula, two linear function is separately calculated, each of the two linear function being equal to the number of times of use to which the substituted ordinal number is assigned.

5. The information processing apparatus according to claim 4, wherein
for at least a rate of change of the number of times of use at a beginning of the period identified by the candidate identification unit among the rate of change of the number of times of use at the beginning and a rate of change of the number of times of use at an ending of the period identified by the candidate identification unit, the period determination unit determines whether or not the rate of change is greater than a predetermined second rate, and the period determination unit determines the period whose rate of change is greater than the predetermined second rate not to be the popularity period.

6. The information processing apparatus according to claim 1, wherein
on the basis of actual numbers of times of use and the threshold value determined by the threshold value determination unit, the candidate identification unit identifies a likely period as the period in which the numbers of times of use exceeds the threshold value by using dynamic programming.

7. The information processing apparatus according to claim 6, wherein
for at least a rate of change of the number of times of use at a beginning of the period identified by the candidate identification unit among the rate of change of the number of times of use at the beginning and a rate of change of the number of times of use at an ending of the period identified by the candidate identification unit, the period determination unit determines whether or not the rate of change is greater than a predetermined second rate, and
the period determination unit determines the period whose rate of change is greater than the predetermined second rate not to be the popularity period.

8. The information processing apparatus according to claim 1, wherein
for at least a rate of change of the number of times of use at a beginning of the period identified by the candidate identification unit among the rate of change of the number of times of use at the beginning and a rate of change of the number of times of use at an ending of the period identified by the candidate identification unit, the period determination unit determines whether or not the rate of change is greater than a predetermined second rate, and
the period determination unit determines the period whose rate of change is greater than the predetermined second rate not to be the popularity period.

9. The information processing apparatus according to claim 1, wherein
when any of the at least one period identified by the candidate identification unit is shorter than a predetermined length, the period determination unit determines the period shorter than the predetermined length not to be the popularity period.

10. The information processing apparatus according to claim 1, further comprising:
a grouping unit that puts a second keyword different from a first keyword whose popularity period is identified by the period determination unit into a keyword group to which the first keyword belongs when transition of the number of times of use of the first keyword is similar to transition of the number of times of use of the second keyword.

11. The information processing apparatus according to claim 10, wherein
the grouping unit does not put the second keyword into the group when a category to which the first keyword is related is different from a category to which the second keyword is related.

12. The information processing apparatus according to claim 1, further comprising:
a priority control unit that controls priority of presentation of each of a plurality of keywords, each of the keywords including one or more characters inputted in a keyword input area by a user,
wherein, on the basis of a relationship between the present time and the popularity period determined by the period determination unit, the priority control unit controls the priority of a keyword whose popularity period is identified.

13. An information processing method performed by a computer, the method comprising:
a threshold value determination step of determining a threshold value of a number of times of use of a keyword on the basis of the number of times of use of the keyword in each of unit periods included in a cycle period;
a candidate identification step of identifying at least one period as a candidate for a popularity period in which the use of the keyword exceeds the threshold value, the candidate being included in the cycle period; and
a period determination step of, when any of the at least one period identified in the candidate identification step does not satisfy a condition that a situation in which the numbers of times of use in the period identified in the candidate identification step exceeds the threshold value determined in the threshold value determination step is different from a situation based on a periodic popularity of the keyword, determining the period not satisfying the condition to be the popularity period, wherein
when a protrusion degree of any of the at least one period identified by the candidate identification step is smaller than a predetermined first rate, the period determination step determines the period whose protrusion degree is smaller than the predetermined first rate not to be the popularity period, the protrusion degree being a degree of protruding of the number of times of use in the identified period and being calculated based on the number of times of use in at least one of the unit periods included in the identified period and the threshold value determined by the threshold value determination step.

14. A non-transitory recording medium in which an information processing program is computer-readably recorded, the information processing program causing a computer to function as:
a threshold value determination unit that determines a threshold value of a number of times of use of a keyword on the basis of the number of times of use of the keyword in each of unit periods included in a cycle period;
a candidate identification unit that identifies a period as a candidate for a popularity period in which the use of the keyword exceeds the threshold value, the candidate being included in the cycle period, and
a period determination unit that, when any of the at least one period identified by the candidate identification unit does not satisfy a condition that a situation in which the numbers of times of use in the period identified by the candidate identification unit exceeds the threshold value determined by the threshold value determination unit is different from a situation based on a periodic popularity of the keyword, determines the period not satisfying the condition to be the popularity period, wherein
when a protrusion degree of any of the at least one period identified by the candidate identification unit is smaller than a predetermined first rate, the period determination unit determines the period whose protrusion degree is smaller than the predetermined first rate not to be the popularity period, the protrusion degree being a degree of protruding of the number of times of use in the identified period and being calculated based on the number of times of use in at least one of the unit periods included in the identified period and the threshold value determined by the threshold value determination unit.

* * * * *